United States Patent
Ko et al.

(10) Patent No.: US 8,539,531 B2
(45) Date of Patent: Sep. 17, 2013

(54) MOBILE TERMINAL, METHOD OF PARTICIPATING IN INTERACTIVE SERVICE THEREIN, INTERNET PROTOCOL TELEVISION TERMINAL AND COMMUNICATION SYSTEM INCLUDING THE SAME

(75) Inventors: Young Seok Ko, Seoul (KR); Jang Hyung Cho, Seoul (KR); Jae Phil Ki, Seoul (KR); Yong Chan Jeong, Suwon-Si (KR)

(73) Assignee: LG Electronics Inc., Seoul (KR)

( * ) Notice: Subject to any disclaimer, the term of this patent is extended or adjusted under 35 U.S.C. 154(b) by 278 days.

(21) Appl. No.: 12/777,054

(22) Filed: May 10, 2010

(65) Prior Publication Data
US 2010/0319023 A1 Dec. 16, 2010

(30) Foreign Application Priority Data
Jun. 11, 2009 (KR) ........................ 10-2009-0051966

(51) Int. Cl.
*G06F 13/00* (2006.01)
*G06F 3/00* (2006.01)
*H04N 5/445* (2011.01)

(52) U.S. Cl.
USPC ................... 725/61; 725/37; 725/39; 725/60; 725/62

(58) Field of Classification Search
USPC .......................... 725/37, 60–62, 39
See application file for complete search history.

(56) References Cited

U.S. PATENT DOCUMENTS

| | | | | |
|---|---|---|---|---|
| 7,941,092 | B2* | 5/2011 | Rao | 455/3.04 |
| 2004/0230656 | A1* | 11/2004 | Sugawara | 709/206 |
| 2006/0010472 | A1* | 1/2006 | Godeny | 725/62 |
| 2007/0006260 | A1* | 1/2007 | Yoon et al. | 725/39 |
| 2009/0070375 | A1* | 3/2009 | Choi | 707/104.1 |
| 2009/0150203 | A1* | 6/2009 | Baudisch et al. | 705/8 |
| 2009/0172765 | A1* | 7/2009 | Kim | 725/131 |

* cited by examiner

*Primary Examiner* — Mulugeta Mengesha
(74) *Attorney, Agent, or Firm* — Birch, Stewart, Kolasch & Birch, LLP

(57) ABSTRACT

A mobile terminal including a wireless communication unit configured to wirelessly communicate with an Internet Protocol Television (IPTV) terminal and to receive participation information for participating in an interactive service from the IPTV terminal, an output unit configured to output the received participation information for the interactive service, a user input unit configured to receive an input of response information corresponding to the output participation information for the interactive service, and a control unit configured to control the wireless communication unit to transmit the input response information to the IPTV terminal or to a IPTV related server performing the interactive service with the IPTV terminal, and to receive information corresponding to the interactive service.

14 Claims, 27 Drawing Sheets

FIG. 10A

Voting service participate

Program title: CH1 2009 Election
(AM 9:00 ~ AM 10:00)
Candidate expected to be elected as a member of XX city council 2009?

1. KIM Gab Dong   ☑
2. LEE Chul Soo   ☐
3. CHOI Min Soo   ☐

| View broadcast | Transmit | Change IS |

Voting service executed result

Program title: CH1 2009 Election
Expected voting result for election for a member of XX city council 2009

1. KIM Gab Dong ▨▨▨▨ 50%
2. LEE Chul Soo ▨▨ 30%
3. CHOI Min Soo ▨ 20%

OK

FIG. 13A
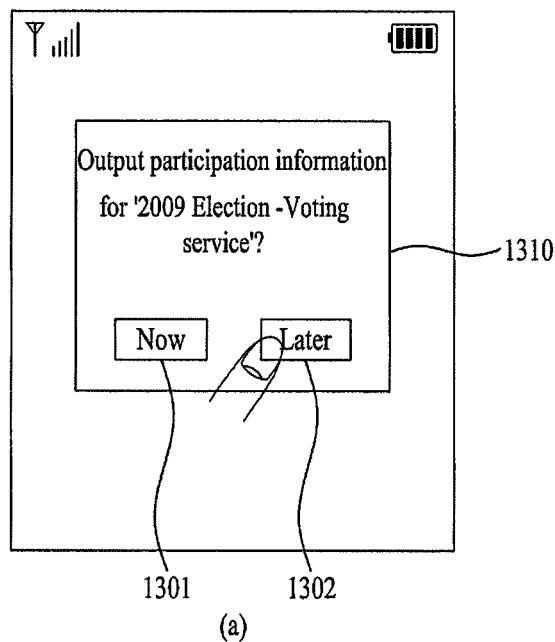
(a)
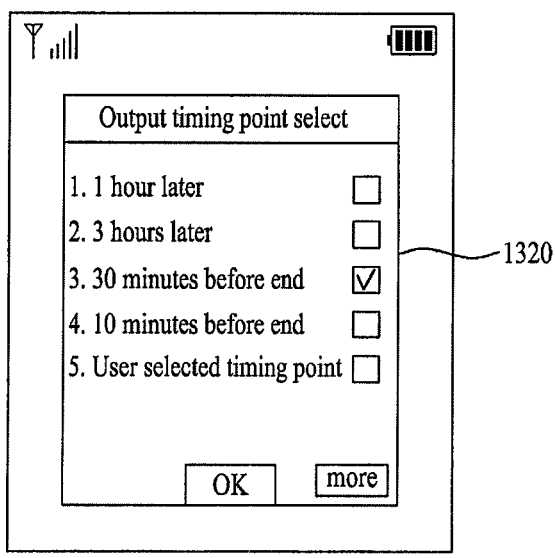
(b)

FIG. 14A
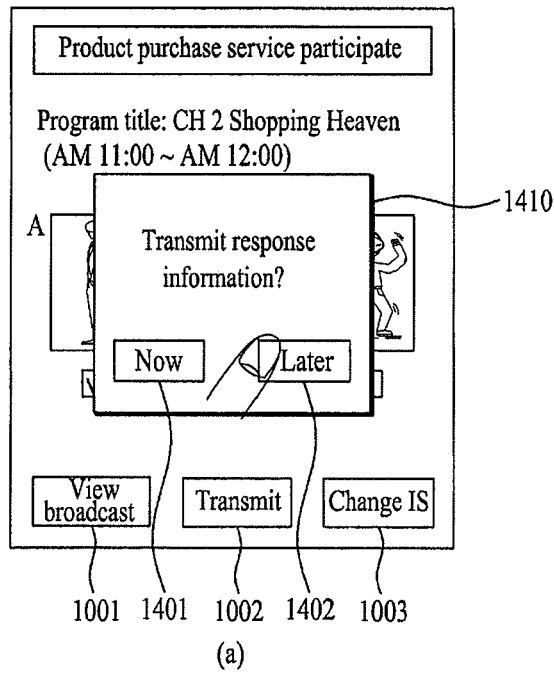
(a)
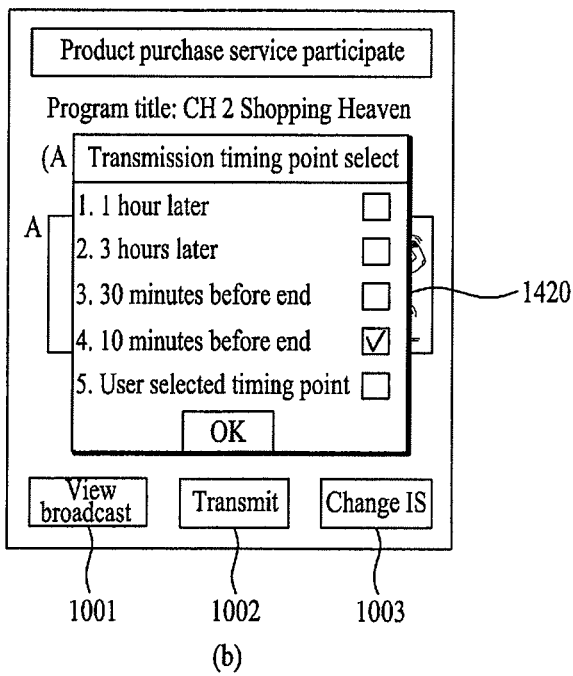
(b)

MOBILE TERMINAL, METHOD OF PARTICIPATING IN INTERACTIVE SERVICE THEREIN, INTERNET PROTOCOL TELEVISION TERMINAL AND COMMUNICATION SYSTEM INCLUDING THE SAME

Pursuant to 35 U.S.C. §119(a), this application claims the benefit of earlier filing date and right of priority to Korean Application No. 10-2009-0051966, filed on Jun. 11, 2009, the contents of which are hereby incorporated by reference herein in their entirety.

BACKGROUND OF THE INVENTION

1. Field of the Invention

The present invention relates to a mobile terminal, an interactive service participating method thereof, internet protocol television terminal and communication system including the same.

2. Discussion of the Related Art

A terminal can perform various functions such as data and voice communications, capturing images and video via a camera, recording audio, playing music files via a speaker system, and displaying images and video on a display. Some terminals include additional functionality which supports game playing, while other terminals are configured as multimedia players. More recently, terminals have been configured to receive broadcast and multicast signals which permit viewing of content such as videos and television programs.

However, the information received about the broadcast programs and corresponding services is limited in nature making it difficult for the user to enjoy all services related to broadcasts.

SUMMARY OF THE INVENTION

Accordingly, one object of the present invention is to provide a mobile terminal, an interactive service participating method thereof, internet protocol television terminal and communication system including the same that substantially obviate one or more problems due to limitations and disadvantages of the related art.

Another object of the present invention is to provide a mobile terminal, an interactive service participating method thereof, internet protocol television terminal and communication system including the same, by which an interactive service targeted by an IPTV terminal can be joined using a mobile terminal.

To achieve these objects and other advantages and in accordance with the purpose of the invention, the present invention provides in one aspect a mobile terminal including a wireless communication unit configured to wirelessly communicate with an Internet Protocol Television (IPTV) terminal and to receive participation information for participating in an interactive service from the IPTV terminal, an output unit configured to output the received participation information for the interactive service, a user input unit configured to receive an input of response information corresponding to the output participation information for the interactive service, and a control unit configured to control the wireless communication unit to transmit the input response information to the IPTV terminal or to a IPTV related server performing the interactive service with the IPTV terminal, and to receive information corresponding to the interactive service. In another aspect, the present invention provides a corresponding method of controlling a mobile terminal.

In another aspect, the present invention provides an Internet Protocol Television (IPTV) terminal including a communication unit configured to perform an interactive service with an IPTV related server, and to wireless transmit participation information for participating in the interactive service to a mobile terminal, and a control unit configured to receive an input response corresponding to the participation information from the mobile terminal and to control the communication unit to transmit information corresponding to the interactive service to the mobile terminal when the input response indicates the mobile terminal wants to receive the interactive service.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 10A and 10B are diagrams of screen configurations for outputting participation information and an execution result of a voting service when an interactive service provided via an IPTV terminal is the voting service according to an embodiment of the present invention;

FIGS. 13A to 13D are diagrams of screen configurations for setting an outputting timing of output information of an interactive service provided via an IPTV terminal according to an embodiment of the present invention;

FIGS. 14A and 14B are diagrams of screen configurations for setting an outputting timing and method of an interactive service provided via an IPTV terminal according to an embodiment of the present invention;

DETAILED DESCRIPTION OF THE INVENTION

Hereinafter, a mobile terminal relating to embodiments of the present invention will be described below in more detail with reference to the accompanying drawings. Further, the mobile terminal described in the specification can include a cellular phone, a smart phone, a laptop computer, a digital broadcasting terminal, personal digital assistants (PDA), a portable multimedia player (PMP), a navigation system and so on. The configurations according to an embodiment described in this disclosure may also be applicable to a stationary terminal such as a digital TV, a desktop computer and the like.

Figure 1:
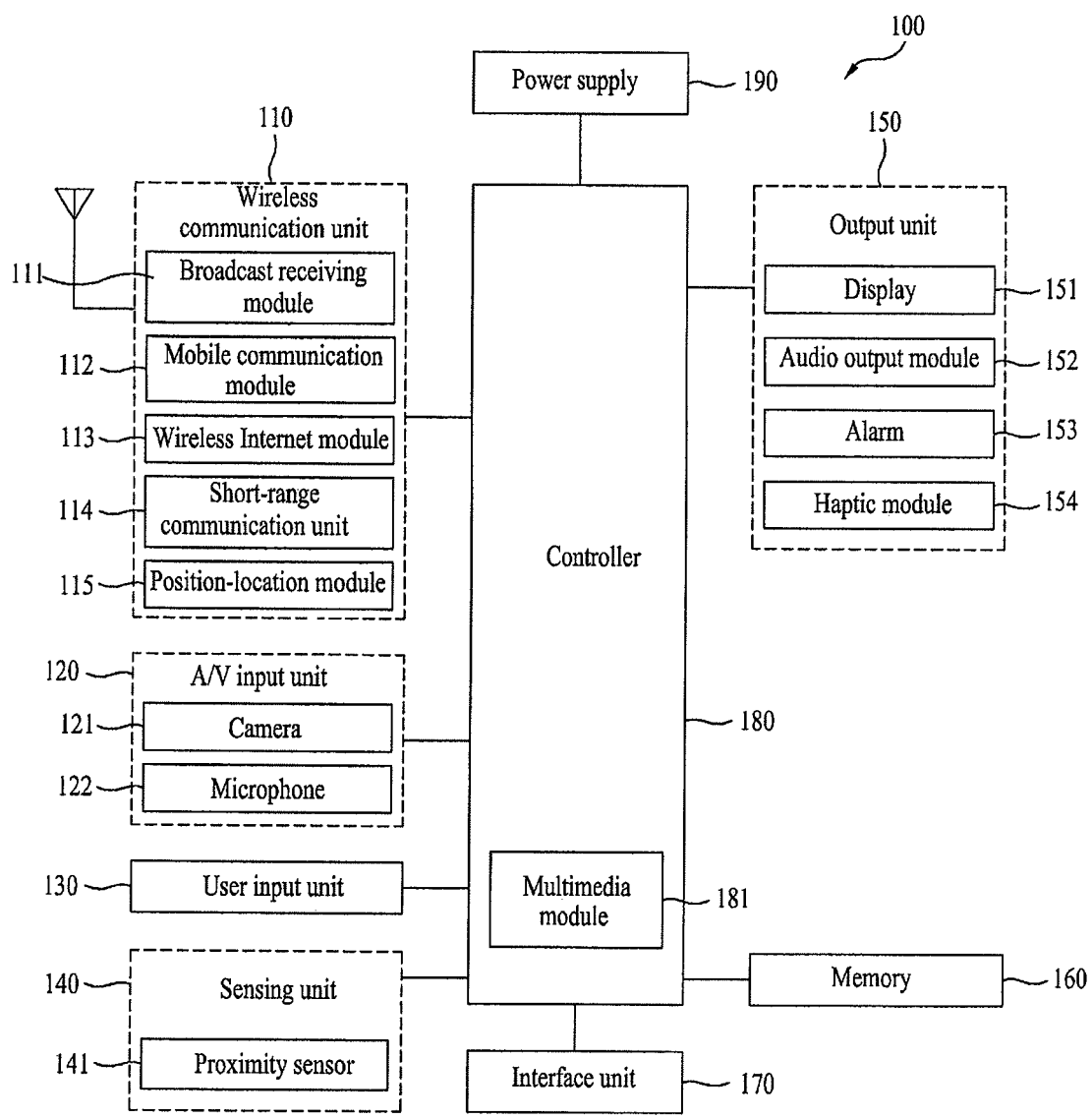
FIG. 1 is a block diagram of a mobile terminal according to one embodiment of the present invention.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 are essential parts and the number of components included in the mobile terminal can be varied.

In addition, the radio communication unit 110 includes at least one module that enables radio communication between the mobile terminal 100 and a radio communication system or between the mobile terminal 100 and a network in which the mobile terminal 100 is located. For example, in FIG. 1, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Further, the broadcasting channel can include a satellite channel and a terrestrial channel. Also, the broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals, but also signals in the form of a combination of a TV broadcasting signal and a radio broadcasting signal.

In addition, the broadcasting related information can be information on a broadcasting channel, a broadcasting program or a broadcasting service provider. The broadcasting related information can be provided even through a mobile communication network. In this instance, the broadcasting related information can be received by the mobile communication module 112. The broadcasting related information can also exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. In particular, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, and the DVB-H and integrated services digital broadcast-terrestrial (ISDB-T) system. The broadcasting receiving module 111 can also be constructed to be suited to broadcasting systems providing broadcasting signals other than the above-described digital broadcasting systems. The broadcasting signals and/or broadcasting related information received through the broadcasting receiving module 111 can also be stored in the memory 160.

Further, the mobile communication module 112 transmits/receives a radio signal to/from at least one of a base station, an external terminal, and a server on a mobile communication network. The radio signal can include a voice call signal, a video telephony call signal or data in various forms according to transmission and receiving of text/multimedia messages. The wireless Internet module 113 corresponds to a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique. The local area communication module 114 corresponds to a module for local area communication. Bluetooth, radio frequency identification (RFID), infrared data association (IrDA), ultra wideband (UWB) and ZigBee can be used as a local area communication technique.

In addition, the position information module 115 confirms or obtains the position of the mobile terminal 100. A global positioning system (GPS) module is a representative example of the position information module 115. Further, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude coordinates at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. The processed image frames can be displayed on a display 151 included in the output unit 150. In addition, the image frames processed by the camera 121 can be stored in the memory 160 or transmitted to an external device through the radio communication unit 110. The mobile terminal 100 can also include at least two cameras according to constitution of the terminal.

Further, the microphone 122 receives an external audio signal in a call mode, a recording mode or a speed recognition mode and processes the received audio signal into electric audio data. The audio data can also be converted into a form that can be transmitted to a mobile communication base station through the mobile communication module 112 and output in the call mode. The microphone 122 can employ various noise removal algorithms for removing noise generated when the external audio signal is received.

In addition, the user input unit 130 receives input data for controlling the operation of the terminal from a user. The user input unit 130 can include a keypad, a dome switch, a touch pad (constant voltage/capacitance), jog wheel, jog switch and so on. The sensing unit 140 senses the current state of the mobile terminal 100, such as an open/close state of the mobile terminal 100, the position of the mobile terminal 100, whether a user touches the mobile terminal 100, the direction of the mobile terminal 100 and acceleration/deceleration of the mobile terminal 100 and generates a detection signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor 141.

In addition, the output unit 150 generates visual, auditory or tactile output and in FIG. 1 includes the display 151, an audio output module 152, an alarm 153, and a haptic module 154. The display 151 displays information processed by the mobile terminal 100. For example, the display 151 displays a UI or graphic user interface (GUI) related to a telephone call when the mobile terminal is in the call mode. The display 151 also displays a captured or/and received image, UI or GUI when the mobile terminal 100 is in the video telephony mode or the photographing mode.

The display 151 can also include at least one of a liquid crystal display, a thin film transistor liquid crystal display, an organic light-emitting diode display, a flexible display and a three-dimensional display. Some of these displays can be of a transparent type or a light transmission type, which is referred to as a transparent display. The transparent display also includes a transparent liquid crystal display. The rear structure of the display unit 151 can also be of the light transmission type. According to this structure, a user can see an object located behind the body of the mobile terminal 100 through an area of the body of the mobile terminal 100, which is occupied by the display 151.

Further, the mobile terminal 100 can include at least two displays 151 according to constitution of the terminal. For example, the mobile terminal 100 can include a plurality of displays that are arranged on a single face at a predetermined distance or integrated. Otherwise, the plurality of displays can be arranged on different sides. In addition, when the display 151 and a sensor sensing touch (referred to as a touch sensor hereinafter) form a layered structure, which is referred to as a touch screen hereinafter, the display 151 can be used as an input device in addition to an output device. The touch sensor can be in the form of a touch film, a touch sheet and a touch pad, for example.

Also, the touch sensor can be constructed such that it converts a variation in pressure applied to a specific portion of the display 151 or a variation in capacitance generated at a specific portion of the display 151 into an electric input signal. The touch sensor can also be constructed such that it can sense pressure of touch as well as the position and area of touch. When touch input is applied to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal 100, surrounded by the touch screen, or near the touch screen. The proximity sensor 141 senses an object approaching a predetermined sensing face or an object located near the proximity sensor 141 using an electromagnetic force or infrared rays without having mechanical contact. Further, the proximity sensor 141 has a lifetime longer than that of a contact sensor and has wide application. The proximity sensor 141 also includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

In addition, a capacitive touch screen is constructed such that a proximity of a pointer is detected through a variation in an electric field according to the proximity of the pointer. In this instance, the touch screen (touch sensor) can be classified as a proximity sensor. For convenience of explanation, an action of approaching the pointer to the touch screen while the pointer is not in contact with the touch screen such that the location of the pointer on the touch screen is recognized is referred to as a "proximity touch" and an action of bringing the pointer into contact with the touch screen is referred to as a "contact touch" in the following description. Also, a proximity touch point of the pointer on the touch screen means a point of the touch screen to which the pointer corresponds perpendicularly to the touch screen when the pointer proximity-touches the touch screen.

Further, the proximity sensor 141 senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can also be displayed on the touch screen.

Also, the audio output module 152 can output audio data received from the radio communication unit 110 or stored in the memory 160 in a call signal receiving mode, a telephone call mode or a recording mode, a speech recognition mode and a broadcasting receiving mode. The audio output module 152 also outputs audio signals related to functions (for example, a call signal incoming tone, a message incoming tone, etc.) performed in the mobile terminal 100. The audio output module 152 can include a receiver, a speaker, a buzzer, etc.

The alarm 153 outputs a signal for indicating a generation of an event of the mobile terminal 100. Examples of events generated in the mobile terminal 100 include receiving a call signal, receiving a message, inputting a key signal, inputting touch, etc. The alarm 153 can also output signals in forms different from video signals or audio signals, for example, a signal for indicating a generation of an event through vibration. The video signals or the audio signals can also be output through the display unit 151 or the audio output module 152.

In addition, the haptic module 154 generates various haptic effects that the user can feel. A representative example of the haptic effects is vibration. The intensity and pattern of vibration generated by the haptic module 154 can also be controlled. For example, different vibrations can be combined and output or sequentially output. The haptic module 154 can also generate a variety of haptic effects including an effect of stimulus according to an arrangement of pins vertically moving for a contact skin face, an effect of stimulus according to a jet force or sucking force of air through a jet hole or a sucking hole, an effect of stimulus of rubbing the skin, an effect of stimulus according to contact of an electrode, an effect of stimulus using an electrostatic force and an effect according to reproduction of cold and warmth using an element capable of absorbing or radiating heat in addition to vibrations. Further, the haptic module 154 can not only transmit haptic effects through direct contact but also allow the user to feel haptic effects through kinesthetic sense of his or her fingers or arms. The mobile terminal 100 can also include at least two or more haptic modules 154 according to constitution of the mobile terminal.

In addition, the memory 160 stores a program for the operation of the controller 180 and temporarily stores input/output data (for example, phone book, messages, still images, moving images, etc.). The memory 160 can also store data about vibrations and sounds in various patterns, which are output when a touch input is applied to the touch screen. The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

Further, the interface 170 serves as a path to all external devices connected to the mobile terminal 100. The interface 170 receives data or power from the external devices and transmits the data or power to the internal components of the mobile terminal 100 or transmits data of the mobile terminal 100 to the external devices. The interface 170 can also include a wired/wireless headset port, an external charger port, a wired/wireless data port, a memory card port, a port for connecting a device having a user identification module, an audio I/O port, a video I/O port, an earphone port, etc., for example.

In addition, an identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

Also, the interface 170 can serve as a path through which power from an external cradle is provided to the mobile terminal 100 when the mobile terminal 100 is connected to the external cradle or a path through which various command signals input by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. In FIG. 1, the controller 180 includes a multimedia module 181 for playing multimedia. The multimedia module 181 can be included in the controller 180 or separated from the controller 180. Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

Further, various embodiments of the present invention can be implemented in a computer or similar device readable recording medium using software, hardware or a combination thereof, for example. According to a hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. The embodiments can also be implemented by the controller 180.

According to a software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2A:
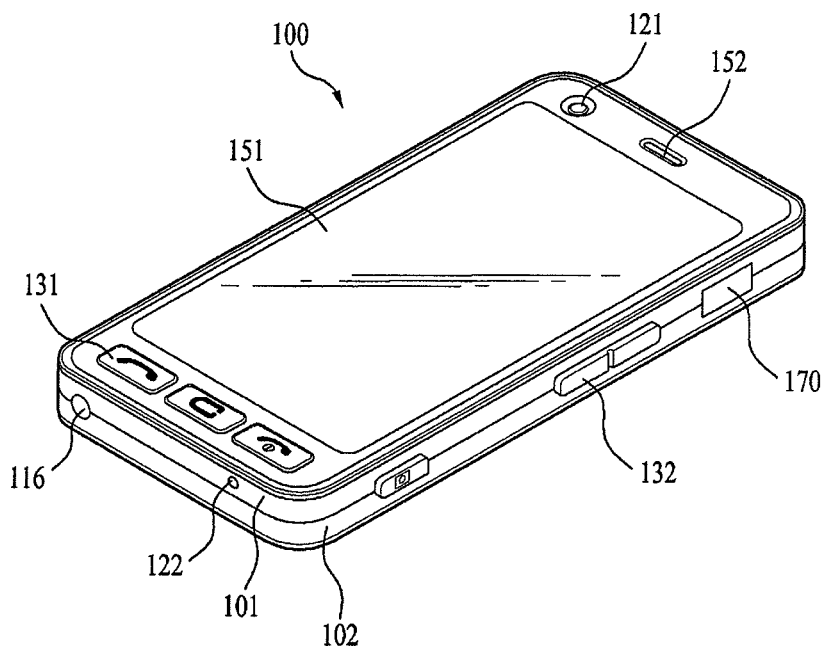
FIG. 2A is a front perspective diagram of a mobile terminal according to one embodiment of the present invention.

Next, FIG. 2A is a front perspective view of a mobile terminal or a handheld terminal 100 according to an embodiment of the present invention. As shown, the mobile terminal 100 is a bar type terminal body. However, the present invention is not limited to a bar type terminal and can be applied to terminals of various types including a slide type, folder type, swing type and swivel type terminals having at least two bodies that are relatively movably combined.

In addition, the terminal body includes a case (a casing, a housing, a cover, etc.) forming the exterior of the terminal 100. In the present embodiment, the case is divided into a front case 101 and a rear case 102. Various electronic components are also arranged in the space formed between the front case 101 and the rear case 102. At least one middle case can be additionally arranged between the front case 101 and the rear case 102. The cases can also be formed of plastics through injection molding or be made of a metal material such as stainless steel (STS) or titanium (Ti).

In addition, the display 151, the audio output unit 152, the camera 121, user input units 131 and 132 of the user input unit 130 (FIG. 1), the microphone 122 and the interface 170 are arranged in the terminal body, specifically, in the front case 101. Also, the display 151 occupies most part of the main face of the front case 101. The audio output unit 152 and the camera 121 are arranged in a region in proximity to one of both ends of the display 151 and the user input unit 131 and the microphone 122 are located in a region in proximity to the other end of the display 151. In addition, the user input unit 132 and the interface 170 are arranged on the sides of the front case 101 and the rear case 102.

Further, the user input unit 130 is operated to receive commands for controlling the operation of the handheld terminal 100 and can include the operating units 131 and 132. The operating units 131 and 132 can be referred to as manipulating portions and employ any tactile manner in which a user operates the operating units 131 and 132 while having tactile feeling. The operating units 131 and 132 can also receive various inputs. For example, the operating unit 131 receives commands such as start, end and scroll, and the second operating unit 132 receives commands such as control of the volume of sound output from the audio output unit 152 or conversion of the display 151 to a touch recognition mode.

Figure 2B:
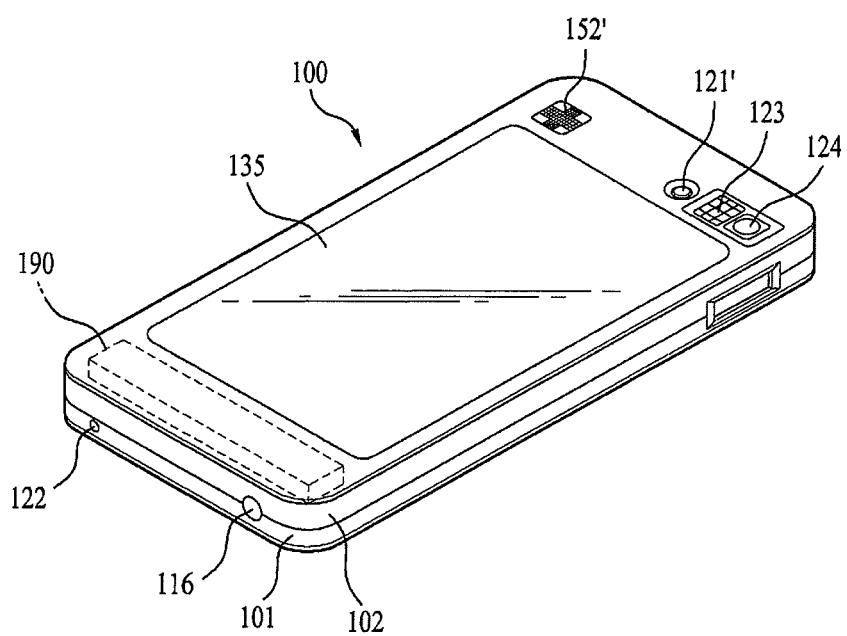
FIG. 2B is a rear perspective diagram of a mobile terminal according to one embodiment of the present invention.

Next, FIG. 2B is a rear perspective view of the mobile terminal 100 shown in FIG. 2A according to an embodiment of the present invention. Referring to FIG. 2B, a camera 121' is additionally attached to the rear side of the terminal body, that is, the rear case 102. The camera 121' has a photographing direction opposite to that of the camera 121 shown in FIG. 2A and can have pixels different from those of the camera 121 shown in FIG. 2A. For example, it is preferable that the camera 121 has low pixels such that it can capture an image of the face of a user and transmit the image to a receiving part for video telephony, while the camera 121' has high pixels because it captures an image of a general object and does not immediately transmit the image in many instances. The cameras 121 and 121' can also be attached to the terminal body such that they can be rotated or pop-up.

A flash bulb 123 and a mirror 124 are also arranged in proximity to the camera 121'. The flash bulb 123 lights an object when the camera 121' takes a picture of the object, and the mirror 124 is used for the user to look at his/her face in the mirror when the user wants to self-photograph himself/herself using the camera 121'. An audio output unit 152' is also provided on the rear side of the terminal body. The audio output unit 152' can thus achieve a stereo function with the audio output unit 152 shown in FIG. 2A and be used for a speaker phone mode when the terminal is used for a telephone call.

A broadcasting signal receiving antenna 124 is also attached to the side of the terminal body in addition to an antenna for telephone calls. The antenna 124 constructing a part of the broadcasting receiving module 111 shown in FIG. 1 can be set in the terminal body such that the antenna 124 can be retracted from the terminal body. Further, the power supply 190 for providing power to the handheld terminal 100 is set in the terminal body. The power supply 190 can be included in the terminal body or detachably attached to the terminal body. A touch pad 135 for sensing touch is also attached to the rear case 102. The touch pad 135 can be of a light transmission type as the display 151. In this instance, if the display 151 outputs visual information through both sides thereof, the visual information can be recognized through the touch pad 135. The information output through both sides of the display 151 can also be controlled by the touch pad 135. Otherwise, a display is additionally attached to the touch pad 135 such that a touch screen can be arranged even in the rear case 102.

The touch pad 135 also operates in connection with the display 151 of the front case 101. The touch pad 135 can be located in parallel with the display 151 behind the display 151, and can be identical to or smaller than the display 151 in size. Interoperations of the display 151 and the touch pad 135 will now be described with reference to FIGS. 3A and 3B.

Figure 3:
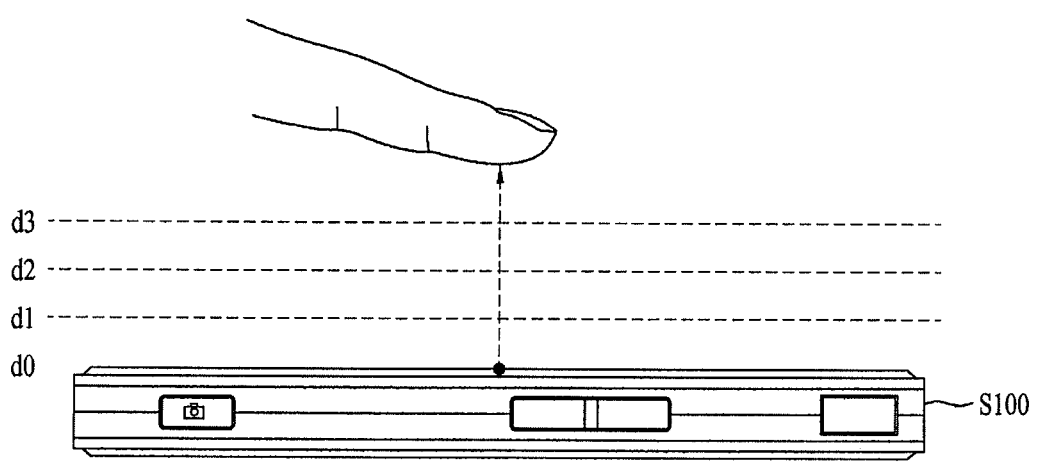
FIG. 3 is a diagram to explain the concept of proximity depth of a proximity sensor according to an embodiment of the present invention.

The proximity sensor 141 described with reference to FIG. 1 will now be explained in more detail with reference to FIG. 3. That is, FIG. 3 is a conceptional view for explaining a proximity depth of the proximity sensor 141. As shown in FIG. 3, when a pointer such as a user's finger approaches the touch screen, the proximity sensor 141 located inside or near the touch screen senses the approach and outputs a proximity signal. In addition, the proximity sensor 141 can be constructed such that it outputs a proximity signal according to the distance between the pointer approaching the touch screen and the touch screen (referred to as "proximity depth"). The distance in which the proximity signal is output when the pointer approaches the touch screen is referred to as a detection distance. The proximity depth can be known by using a plurality of proximity sensors having different detection distances and comparing proximity signals respectively output from the proximity sensors.

Further, FIG. 3 shows the section of the touch screen in which proximity sensors capable of sensing three proximity depths are arranged. Proximity sensors capable of sensing less than three or more than four proximity depths can be arranged in the touch screen. Specifically, when the pointer completely comes into contact with the touch screen (D0), it is recognized as contact touch. When the pointer is located within a distance D1 from the touch screen, it is recognized as proximity touch of a first proximity depth, and when the pointer is located in a range between the distance D1 and a distance D2 from the touch screen, it is recognized as proximity touch of a second proximity depth. Further, when the pointer is located in a range between the distance D2 and a distance D3 from the touch screen, it is recognized as proximity touch of a third proximity depth, and when the pointer is located at longer than the distance D3 from the touch screen, it is recognized as cancellation of the proximity touch.

Accordingly, the controller 180 can recognize the proximity touch as various input signals according to the proximity distance and proximity position of the pointer with respect to the touch screen and perform various operation controls according to the input signals.

Embodiments of the present invention will now be explained in more detail. The embodiments also refer to the display 151 as a touch screen. A touch also includes both a proximity touch and a direct touch in the following description. Furthermore, touch input includes every possible touch according to variations in the number of touches, duration, behavior and form of a touch, such as various input signals corresponding to touch variations, for example, touch down, touch up, a lapse of predetermined touch duration, drag and drop, etc.

Figure 4A:
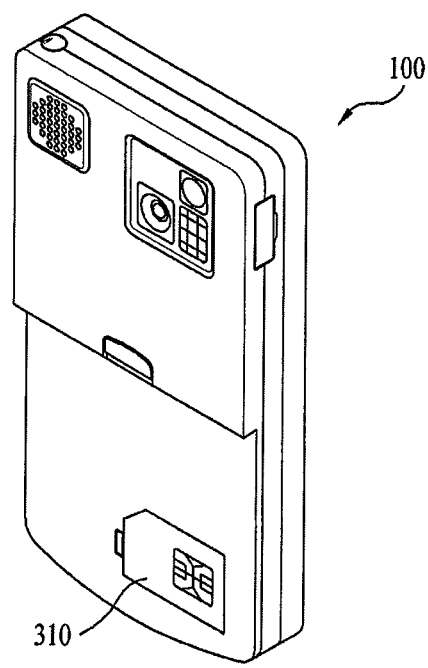
FIGS. 4A and 4B are rear perspective diagrams of a mobile terminal according to one embodiment of the present invention, in which an identity device is detachably attached to the mobile terminal.
Figure 4B:
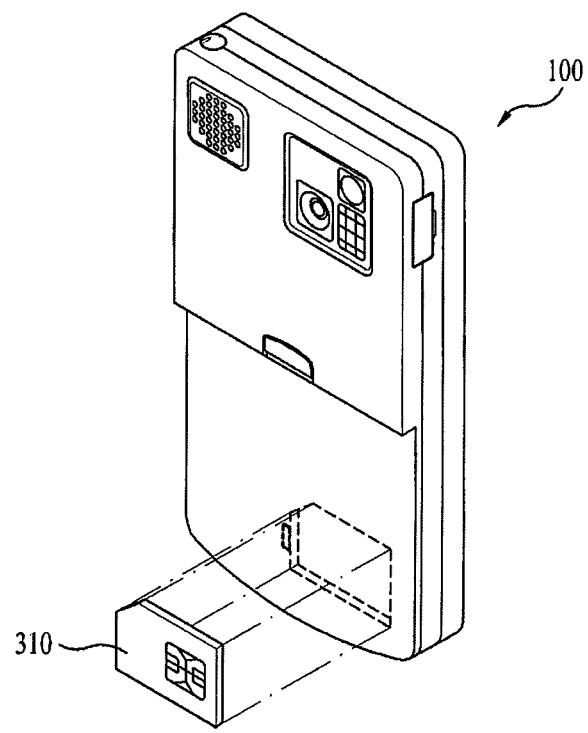

Next, FIGS. 4A and 4B are backside perspective diagrams of a mobile terminal including an identity device that can be detached/attached to/from the mobile terminal according to an embodiment of the present invention. The identity device can also include a SIM card, for example.

Referring to FIGS. 4A and 4B, the terminal 100 includes an identity device 310 detachable from the terminal 100. Therefore, an old identity device can be replaced by a new identity device. The identity device 310 can also be loaded in the terminal 100 by being combined with the interface unit 170. Alternatively, the identity device 310 can be loaded in the terminal 100 by being connected to a connector separately provided. In addition, a connector for connecting the identity device 310 to the terminal 100 can be provided to any place of the terminal such as a backside, a lateral side, a front side and the like.

Figure 5A:
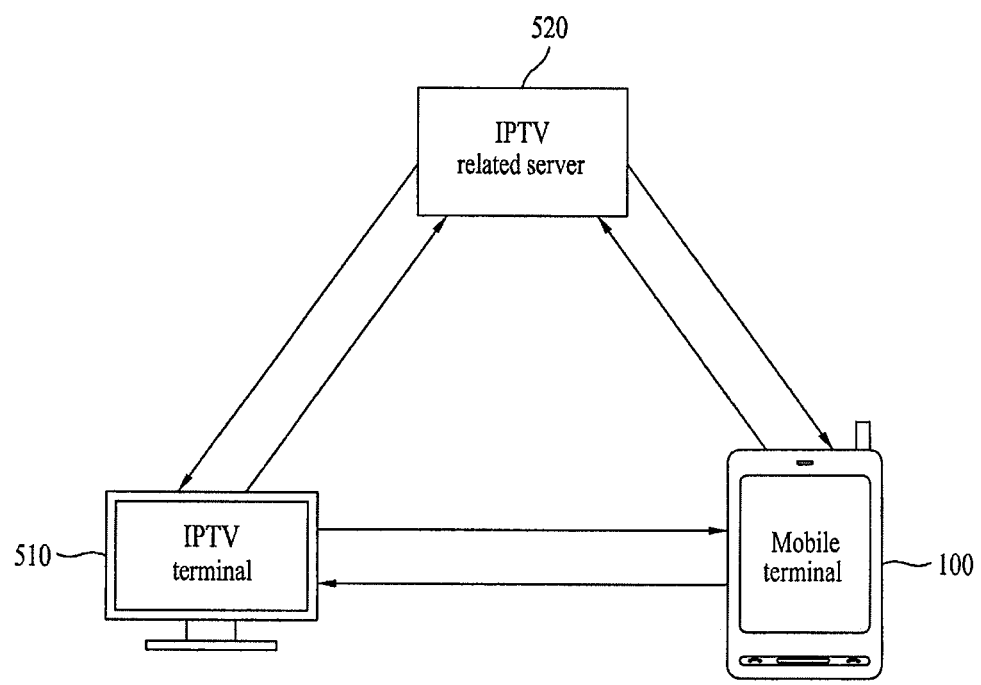
FIG. 5A is a structural diagram of a communication system including a mobile terminal and an IPTV terminal according to one embodiment of the present invention.

Turning next to FIG. 5A, which is a structural diagram of a communication system including the mobile terminal 100, an internet protocol television (IPTV) terminal 510 and an IPTV related server 520 according to one embodiment of the present invention. Further, the IPTV terminal mentioned in this specification corresponds to a terminal that supports an interactive service related service using an Internet protocol.

In addition, the interactive service mentioned in this specification is a service performed based on interactive data communication between the IPTV related server 520 and the IPTV terminal 510 and is a service for receiving response information on service information from a user after providing the service information for requesting user participation to the IPTV terminal 510. Also, the broadcast content mentioned in this specification corresponds to a broadcast channel or a broadcast program provided via an Internet protocol.

Referring to FIG. 5A, the IPTV related server 520 corresponds to a server that provides an interactive broadcast related service to an IPTV function supportable terminal (e.g., the IPTV terminal 510). For instance, the interactive broadcast related service is one example of a service for transmitting and receiving data between the IPTV related server 520 and the IPTV terminal 510 bi-directionally and can include a broadcast service (VOD type) or an interactive service.

In addition, the IPTV terminal 510 and the mobile terminal 100 can transmit and receive data using a short-range wireless communication, a data communication or an Internet communication. For instance, the short-range wireless communication can include Bluetooth, IrDA (infrared data association), Zigbee, UWB (ultra wide band), DLNA (digital living network alliance) or the like, and the data communication can include WiFi, Wimax, WiBro or the like.

In particular, when transmitting and receiving data using the short-range wireless communication, the mobile terminal 100 uses the short-range communication module 114, and when transmitting and receiving data using the data communication or the Internet communication, the mobile terminal 100 uses the wireless internet module 113.

According to an embodiment of the present invention, the IPTV terminal 510 and the IPTV related server 520 perform the interactive service using the Internet communication, and the mobile terminal 100 receives participation information for the interactive service from the IPTV terminal 510 using the short-range wireless communication, the data communication or the Internet communication. Therefore, the mobile terminal 100 can participate in the interactive service that is an execution target off the IPTV terminal 510.

Thus, in one embodiment, a user can use their terminal to receive and interact with an interactive service provided by their IPTV (television) without having to remain seated at their IPTV. Further, the communication is short range communication or Internet communication which are generally free of charge. Thus, the user can move around their house and still participate in interactive services performed or provided by the IPTV terminal and IPTV related server.

Figure 5B:
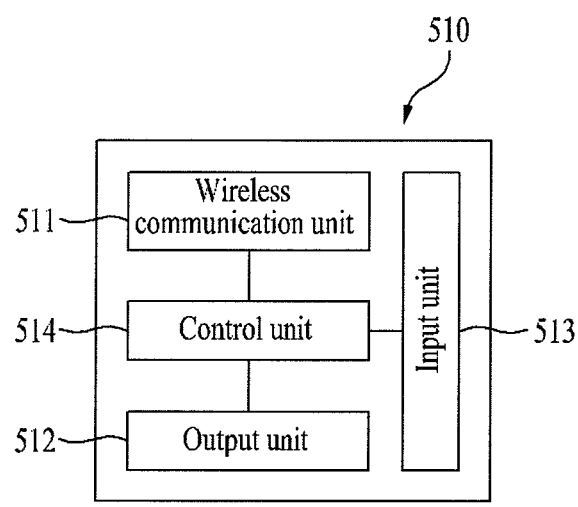
FIG. 5B is a block diagram of an IPTV terminal according to one embodiment of the present invention.

Next, FIG. 5B is a block diagram of the IPTV terminal 510. As shown in FIG. 5B, the IPTV terminal 510 includes a wireless communication unit 511, an output unit 512, an input unit 513, and a control unit 514. Further, the wireless communication unit 511 performs data transmission and reception with the IPTV related server 520 and the mobile terminal 100.

In addition, the output unit 512 outputs IPTV relevant information received by the wireless communication unit 511. Also, the IPTV relevant information can include an IPTV broadcast signal, an IPTV broadcast guide information and the like. Further, the input unit 513 receives an input of an operation related signal for the IPTV terminal 510 from a user. The control unit 514 also controls operations of the above-described elements and overall operations of the IPTV terminal 510.

For instance, when receiving a broadcast content selection signal from a user via the input unit 513, the IPTV terminal 510 can output a broadcast content corresponding to the input broadcast content selection signal via the output unit 512. In addition, the wireless communication unit 511 performs an interactive service with the IPTV related server 520 and transmits participation information for the interactive service to the mobile terminal 100 under the control of the control unit 514. Moreover, when receiving response information on the transmitted participation information from the mobile terminal 100, the wireless communication unit 511 transmits the received response information to the IPTV related server 520 under the control of the control unit 514.

Figure 6:
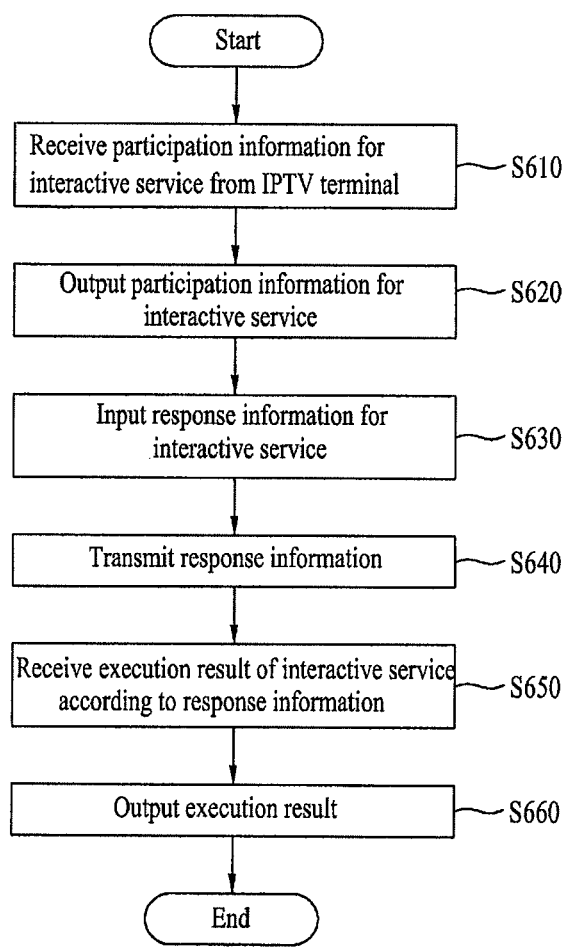
FIG. 6 is a flowchart illustrating an interactive service participating method in a mobile terminal according to one embodiment of the present invention.

Next, a method of participating in an interactive service in a mobile terminal according to one embodiment of the present invention will be explained with reference to the flowchart in FIG. 6. Referring to FIG. 6, the mobile terminal 100 receives participation information for an interactive service from the IPTV terminal 510 using the wireless communication unit 110 (S610).

In performing the receiving step S610, the mobile terminal 100 can use one of a short-range wireless communication and an Internet communication as an access type to the IPTV terminal 510. For instance, the mobile terminal 100 can select one of the short-range wireless communication and the Internet communication as the access type according to a user selection or priority.

Further, the interactive service participation information can include at least one of interactive service content information, interactive service available time information, broadcast content information associated with an interactive service, and recipient address information of response information on an interactive service.

If authority information of the mobile terminal 100 is previously registered at the IPTV terminal 510, the mobile terminal 100 can receive participation information of an interactive service suitable for the previously registered authority information from the IPTV terminal 510. For instance, the interactive service suitable for the authority information can correspond to an interactive service linked with a broadcast content viewable under the age of 18 if the previously registered authority information is viewable for under the age of 18. Also, when the previously registered authority information is a free or pre-paid broadcast content, the interactive service can correspond to an interactive service linked with the free or pre-paid broadcast content.

Further, when a participation in an interactive service is requested by the IPTV terminal 510 (hereinafter named a first case), when the mobile terminal is determined as being located within a predetermined distance from the IPTV terminal 510 (hereinafter named a second case), and when a participation in an interactive service using the IPTV terminal 510 is requested by a user (hereinafter named a third case), the mobile terminal 100 can perform the above described receiving step S610.

In the first case, the mobile terminal 100 receives a participation request signal for participating in an interactive service from the IPTV terminal 510 via the wireless communication unit 110 and then transmits a response signal for the participation request signal to the IPTV terminal 510. The mobile terminal 100 can then receive participation information for participating in the interactive service from the IPTV terminal 510.

Figure 7A:
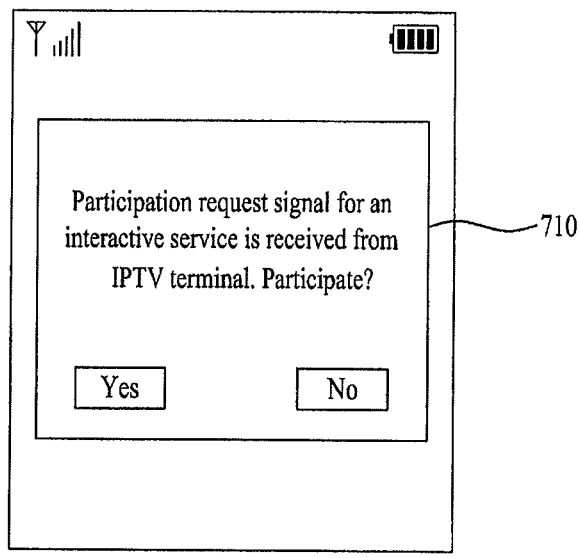
FIGS. 7A to 7D are diagrams of screen configurations allowing the user to select whether to participate in an interactive service provided via an IPTV terminal if a request is made by the IPTV terminal according to an embodiment of the present invention.

The first case will now be explained in more detail with reference to FIGS. 7A to 7D, which are diagrams of screen configurations for selecting whether to participate in an interactive service by a request from the IPTV terminal 510. Referring to FIG. 7A, when the mobile terminal 100 receives a participation request signal for participating in an interactive service from the IPTV terminal 510, the mobile terminal 100 informs the user that the participation request signal has been received. The mobile terminal 100 then enables the user to determine whether to participate in the interactive service. FIG. 7A illustrates the mobile terminal 100 displaying a window 710 including information about the participation request from the IPTV terminal 510.

Further, when transmitting a participation request signal using Internet communication, the IPTV terminal 510 previously stores terminal identification information of the mobile terminal 100 as an IP address, a terminal number (phone number included), an email address and the like and transmits a participation request signal to the mobile terminal 100 using the previously stored terminal identification information. Alternatively, when transmitting a participation request signal using a short-range wireless communication, the IPTV terminal 510 previously stores an identification number of a short-range communication module provided to the mobile terminal 100 and transmits the participation request signal using the previously stored identification number.

As discussed above, if the mobile terminal 100 is located within a predetermined distance from the IPTV terminal 510, the IPTV terminal 510 can transmit a participation request signal to the mobile terminal 100. If the mobile terminal 100 is previously designated as a request target terminal in an interactive service, the IPTV terminal 510 can also transmit a participation request signal. Moreover, the IPTV terminal 510 can transmit a participation request signal to the mobile terminal 100 periodically or at a random timing point.

Figure 7B:
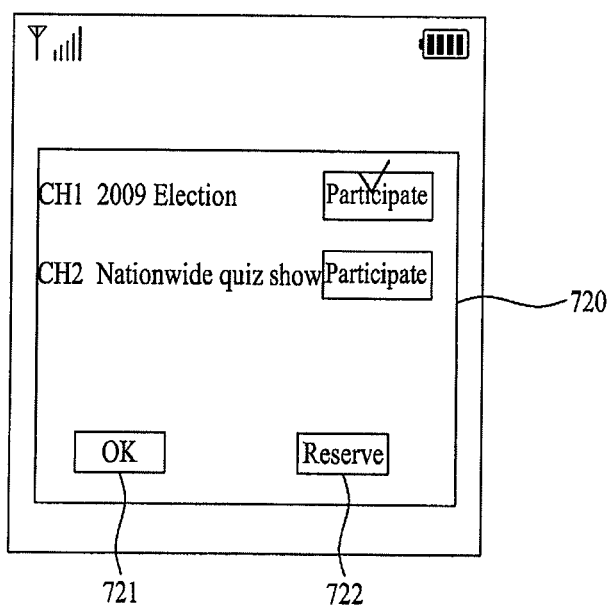

In particular, when accessing the IPTV terminal 510 using short-range wireless communication, the mobile terminal 100 can transmit a participation request signal if located within a predetermined distance available for the short-range wireless communication from the IPTV terminal 510. Then, if the user selects a participation ('yes') in FIG. 7A, the mobile terminal 100 displays a window 720 including interactive services currently provided to the IPTV terminal 510 from the IPTV related server 520 as shown in FIG. 7B. In addition, if the user selects a reservation region 722 in FIG. 7B, the mobile terminal 100 displays information about the reservation request. This feature will which will be described in more detail later.

Figure 7C:
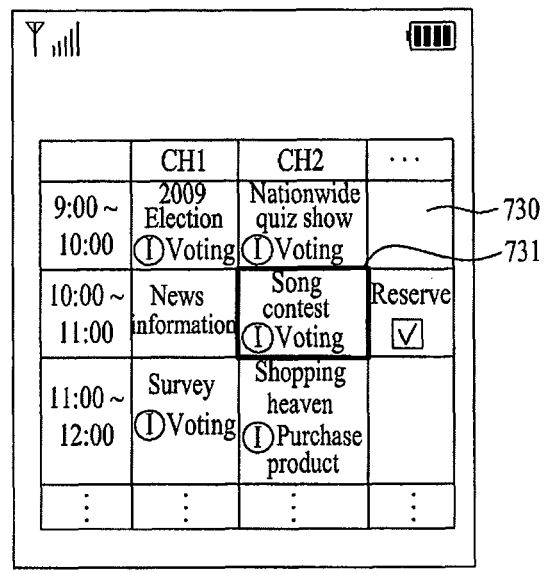

Alternatively, when the user selects a participation ('yes') in FIG. 7A, the mobile terminal 100 can display a window 730 including broadcast organization information of broadcast contents provided to the IPTV terminal 510 from the IPTV related server 520 as shown in FIG. 7C. Further, any broadcast content that is linked with an interactive service can be distinguishably displayed on the broadcast organization information. FIG. 7C illustrates an icon "I" being displayed to inform the user the broadcast content is linked with an interactive service.

In addition, FIG. 7B illustrates the user selecting the CH1 2009 Election as illustrated by the check box. The user can then select the OK button 721 to transmit the request to enter the interactive service to the IPTV terminal 510. The user can also select the Reserve button 722 to reserve a corresponding interactive service.

The user can also select a particular broadcast content including an interactive service by highlighting and selecting the desired broadcast content as shown by the reference number 731 in FIG. 7C. Further, the information in FIG. 7B on the interactive service currently provided to the IPTV terminal 510 from the IPTV related server 520 or the broadcast organization information in FIG. 7C having the interactive service linked broadcast content displayed distinguishably thereon can be received together with the received participation request signal. Then, when the user selects participation in the interactive service (or the participation reservation in FIG. 7B), the information on the interactive service or the broadcast organization information is transmitted to the IPTV terminal 510.

Therefore, the mobile terminal 100 can transmit a response signal to the interactive service participation request signal for participating in a specific interactive service selected by the user in FIG. 7B or 7C to the IPTV terminal 510. Further, as shown in FIG. 7C, the user can select not only a specific interactive service at a current time, but also a specific interactive service that will be performed in the future as indicated by the reference numeral 731.

Figure 7D:
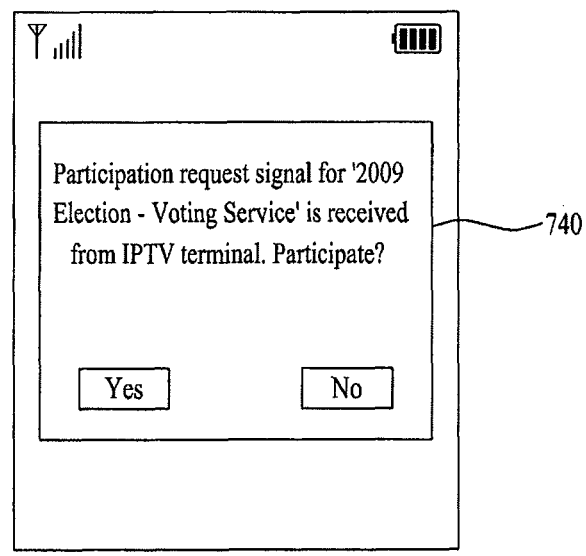

In addition, FIG. 7D illustrates the mobile terminal 100 receiving the participation request signal for a specific interactive service previously designated by the IPTV terminal 510. Thus, as shown in FIG. 7D, the mobile terminal 100 displays a window 740 including information of the participation requested specific interactive service and thus allows the user to select whether to participate in the specific interactive service. If the user selects a participation ('yes') in FIG. 7D, the mobile terminal 100 transmits a participation notification signal for participating in the previously designated specific interactive service to the IPTV terminal 510.

In the second case, if the mobile terminal 100 is determined as being located within a predetermined distance from the IPTV terminal 510, the mobile terminal 100 transmits a participation notification signal for participating in an interactive service to the IPTV terminal 510 according to a user selection or automatically.

In more detail, the mobile terminal 100 can determine how far it is from the IPTV terminal 510 using the position-location module 115. Also, the predetermined distance includes a distance available for a short-range wireless communication or a distance pre-designated as a distance available for a participation in an interactive service via the IPTV terminal 510.

In the third case, when the user requests participation in an interactive service using the IPTV terminal 510, the mobile terminal 100 transmits a participation notification signal for participating in the interactive service to the IPTV terminal 510. Also, in the second or third cases, when transmitting the participation notification information using Internet communication, the mobile terminal 100 can use IPTV terminal identification information (e.g., IP address, email address, etc.) which is previously stored or obtained by a request made by the mobile terminal 100. When transmitting a participation notification information signal using a short-range wireless communication, the mobile terminal 100 can use an identification number of a short-range communication module provided to the IPTV terminal 510, which is previously stored or obtained in the course of a searching process for a short-range communication available terminal.

Figure 8A:
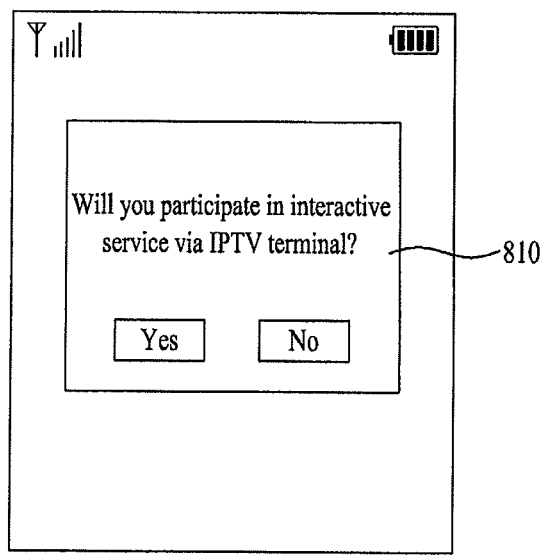
FIGS. 8A to 8C are diagrams of screen configurations allowing the user to select whether to participate in an interactive service provided via an IPTV terminal by a request from a mobile terminal according to an embodiment of the present invention.
Figure 8B:
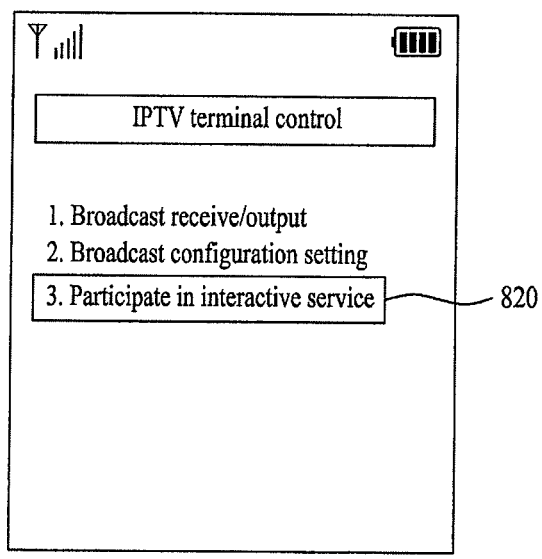
Figure 8C:
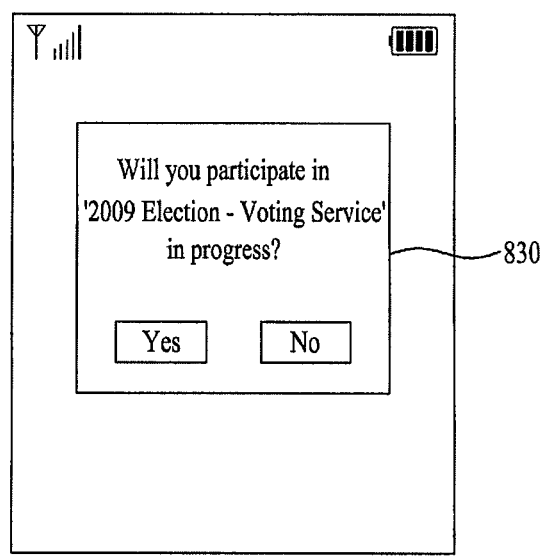

The second and third cases will now be detail with reference to FIGS. 8A to 8C, which are diagrams of screen configurations for selecting whether to participate in an interactive service by a request made by the mobile terminal 100.

Regarding the second case, if the mobile terminal 100 determines that it is located within a predetermined distance from the IPTV terminal 510, the mobile terminal 100 enables a user to determine whether to participate in an interactive service by displaying a window 810 as shown in FIG. 8A. Regarding the third case, the mobile terminal 100 enables a user to select a participation in an interactive service via the IPTV terminal 510 by displaying a window including an option 831 for participating in an interactive service as shown in FIG. 8B. If the user selects a participation ('yes') in FIG. 8A or the option 820 in FIG. 8B, the mobile terminal 100 can display the screen configurations shown in FIG. 7B or 7C. Moreover, the above embodiments described with reference to FIGS. 7B and 7C are applicable to the second or third case.

Also, when determining that a specific interactive service previously designated by the mobile terminal 100 is currently being performed or will be performed within a predetermined time, the mobile terminal 100 allows the user to select whether to participate in the previously designated specific interactive service as shown in FIG. 8C. If the user selects a participation ('yes') in FIG. 8C, the mobile terminal 100 transmits a participation notification signal for the previously designated specific interactive service to the IPTV terminal 510.

Referring back to FIG. 6, the mobile terminal 100 outputs participation information for the interactive service as shown in FIGS. 7 and 8 (S620), and then receives the user input response information for the desired interactive service (S630). Subsequently, the mobile terminal 100 transmits a notification signal indicating that it will participate in the interactive service corresponding to the input designating condition to the IPTV terminal 510 (S640), and receives participation information for the interactive service corresponding to the inputted designating condition from the IPTV terminal 510 (S650). The mobile terminal 100 then outputs the participation information, which was received in the receiving step S610, for the interactive service under the control of the controller 180 (S620).

Figure 9A:
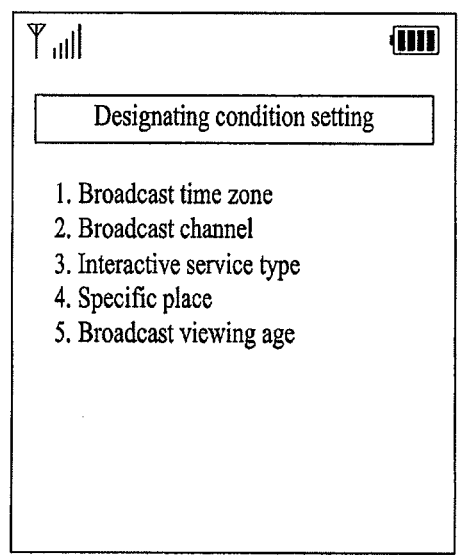
FIGS. 9A to 9F are diagrams of screen configurations allowing the user to select an interactive service designating condition provided via an IPTV terminal according to an embodiment of the present invention.

The input designating condition will now be explained in more detail with reference to FIGS. 9A to 9F, which are diagrams of screen configurations for setting a designating condition for an interactive service provided via the IPTV terminal 510. Referring to FIG. 9A, if the user selects a menu item or key (i.e., a key region if a touchscreen is provided) corresponding to a designating condition setting, the mobile terminal 100 displays a designating condition list including settable designating conditions.

Figure 9B:
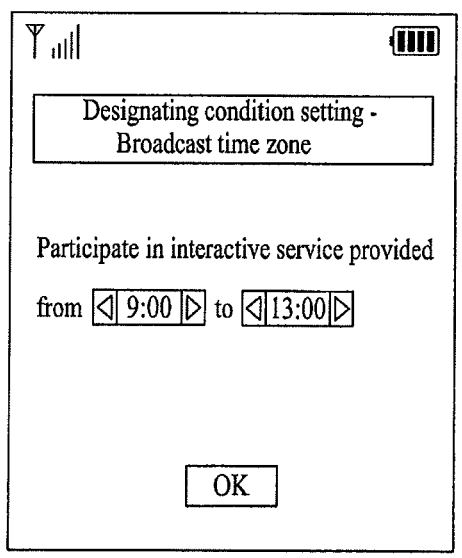

If the user selects a broadcast time zone from the designating condition list shown in FIG. 9A, the mobile terminal 100 enables the user to select a broadcast time zone on which the user will participate in an interactive service as shown in FIG. 9B. For instance, if a broadcast time zone '09:00 to 13:00' is selected in FIG. 9B, the mobile terminal 100 transmits a notification signal indicating that it will participate in an interactive service linked with a broadcast content provided via the IPTV terminal 510 from 09:00 to 13:00 to the IPTV terminal 510 and then receives participation information for the interactive service performed from 09:00 to 13:00 from the IPTV terminal 510.

Figure 9C:
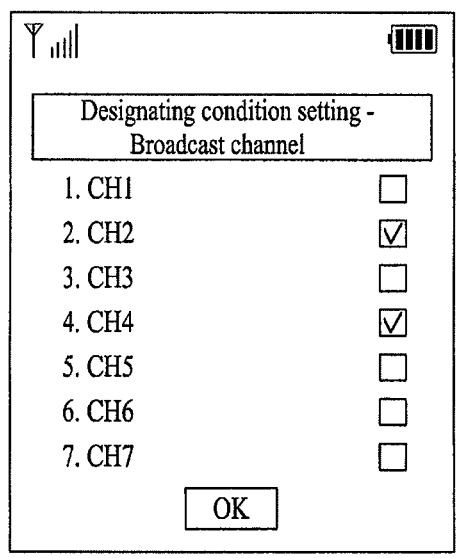

If the user selects a broadcast channel or a broadcast program from the designating condition list shown in FIG. 9A, the mobile terminal 100 enables the user to select a specific broadcast channel from broadcast channels provided via the IPTV terminal 510 as shown in FIG. 9C. For instance, if the user selects the second and fourth broadcast channels in FIG. 9C, the mobile terminal 100 transmits a notification signal indicating that it will participate in an interactive service linked with the second and fourth broadcast channels to the IPTV terminal 510 and then receives participation information for the interactive service performed by being linked with the second and fourth broadcast channels from the IPTV terminal 510.

Figure 9D:
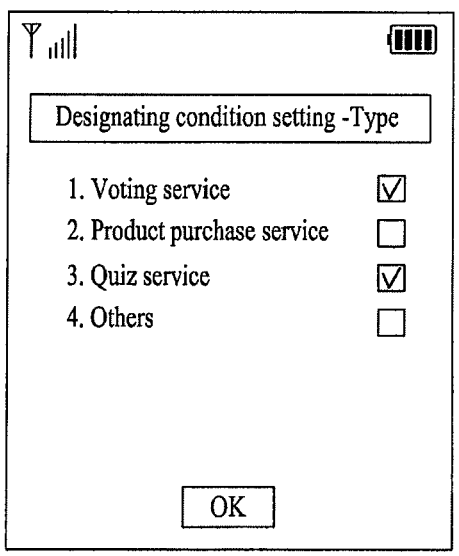

If the user selects an interactive service type from the designating condition list shown in FIG. 9A, the mobile terminal 100 enables the user to select a specific type from types of interactive services that are the execution targets in the IPTV terminal 510 as shown in FIG. 9D. For instance, if the user selects a voting service and a quiz service as interactive service types in FIG. 9D, the mobile terminal 100 transmits a notification signal indicating that it will participate in the voting and quiz services to the IPTV terminal 510 and then receives participation information for the voting and quiz services performed from the IPTV terminal 510.

Figure 9E:
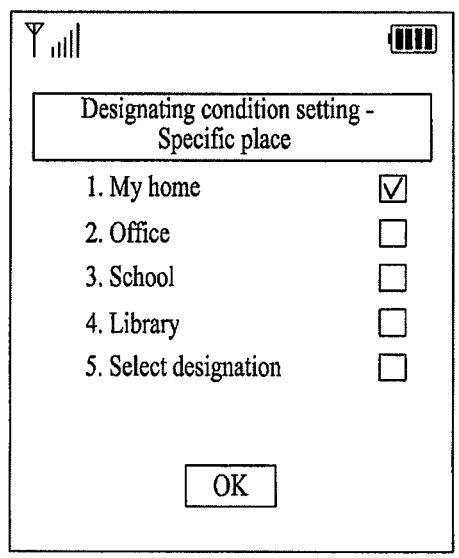

If the user selects a specific place from the designating condition list shown in FIG. 9A, the mobile terminal 100 enables the user to select a place for receiving participation information for an interactive service that is an execution target in the IPTV terminal 510 as shown in FIG. 9E. For instance, when the user selects 'my home' as a participation information receiving place in FIG. 9E, the mobile terminal 100 receives participation information for an interactive service from the IPTV terminal 510 when it is located at a place corresponding to 'my home'.

Figure 9F:
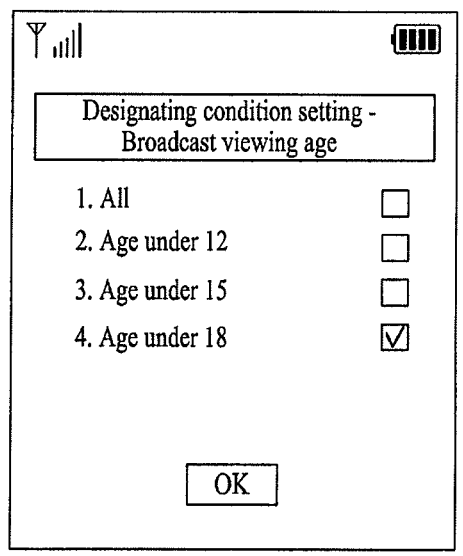

If the user selects a broadcast viewable age from the designating condition list shown in FIG. 9A, the mobile terminal 100 enables the user to select a viewable age for a broadcast content provided via the IPTV terminal 510 as shown in FIG. 9F. For instance, if the user selects 'age under 18' as a broadcast viewable age in FIG. 9F, the mobile terminal 100 transmits a notification signal indicating that it will participate in an interactive service linked with a broadcast content viewable for the ages under 18 to the IPTV terminal 510 and then receives participation information for the interactive service that is performed by being linked with the broadcast content viewable for the age under 180 from the IPTV terminal 510.

In addition, in the above-mentioned first case, as the mobile terminal 100 transmits a notification signal indicating that it will participate in an interactive service corresponding to the aforesaid designating condition to the IPTV terminal 510, the mobile terminal 100 can receive a participation request signal for participating in the interactive service corresponding to the designating condition from the IPTV terminal 510. Alternatively, in the above-mentioned first to third cases, as the mobile terminal 100 transmits a notification signal indicating that it will participate in an interactive service corresponding to the aforesaid designating condition to the IPTV terminal 510, the mobile terminal 100 can receive interactive service information (i.e., the information shown in FIG. 7B or 7C) corresponding to the designating condition from the IPTV terminal 510.

Alternatively, in the above-mentioned first to third cases, the mobile terminal 100 stores the aforesaid designating condition in the memory 160 and can then display information on an interactive service corresponding to the designating condition only in displaying interactive service information (i.e., the information shown in FIG. 7B or 7C) received via the IPTV terminal 510.

As mentioned in the foregoing description, the participation information output in the outputting step S620 can include a broadcast content name (broadcast channel and broadcast program are included) linked with an interactive service, interactive service content information, time information available for a participation in an interactive service, and the like.

Further, in step S630, the mobile terminal 100 receives response information on the interactive service via the user input unit 130 from the user using the interactive service participation information output in the outputting step S620. For instance, the response information can include selection information on a specific one of a plurality of candidates when an interactive service is a voting service. The response information can also include correct answer information on a quiz when an interactive service is a quiz service, and can include purchase selection information on a specific product when an interactive service is a product purchase service.

Subsequently, in step S640, the mobile terminal 100 transmits the response information input in the inputting step S630 to at least one of the IPTV terminal 510 and the IPTV related server 520 using the wireless communication unit 110, under the control of the controller 180. Further, in the transmitting step S640, the terminal 100 can transmit identification information on each of a broadcast content and interactive service linked with the transmitted response information. Therefore, the IPTV terminal 510 or the IPTV related server 520 can check what kind of an interactive service is indicated by the response information received from the mobile terminal 100 or what kind of an interactive service provided by a prescribed broadcast content is indicated by the response information received from the mobile terminal 100.

Next, screen configurations for outputting participation information for participating in an interactive service are explained in more detail with reference to FIGS. 10A, 11A, 11B and 12A. Referring to FIG. 10A, when an interactive service is a voting service, the mobile terminal 100 displays participation information such as broadcast content information linked with a voting service (broadcast channel information_CH1, broadcast program information_2009 election), time information for participating in a voting service (AM 09:00~AM 10:00), and voting service content information.

Therefore, the user can input response information on the voting service within a time for participating in the voting service. If the user selects a send/transmit region or button 1002 in FIG. 10A, the mobile terminal 100 transmits response information on the voting service input in FIG. 10A to the IPTV terminal 510 or the IPTV related server 520 via the wireless communication unit 110. The user can also select a region or button ('view broadcast' region) 1001 for viewing a broadcast content linked with an interactive service, and a region or button ('change IS' region) 1003 for changing an interactive service.

Figure 11A:
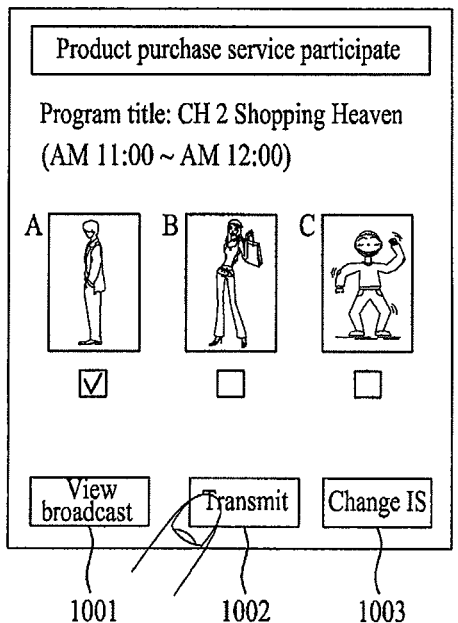
FIGS. 11A to 11D are diagrams of screen configurations for outputting participation information and an execution result of a product purchase service when an interactive service provided via an IPTV terminal is the product purchase service according to an embodiment of the present invention.

Referring to FIG. 11A, when an interactive service is a product purchase service, the mobile terminal 100 displays participation information as broadcast content information linked with a product purchase service (broadcast channel information_CH2, broadcast program information_shopping heaven), time information for participating in a product purchase service (AM 11:00~AM 12:00), and product purchase service content information.

Therefore, the user can input response information on the product purchase service within a time for participating in the product purchase service. Then, if the user selects the send/transmit region or button 1002 in FIG. 11A, the mobile terminal 100 transmits response information on the product purchase service input in FIG. 11A to the IPTV terminal 510 or the IPTV related server 520 via the wireless communication unit 110.

Figure 11B:
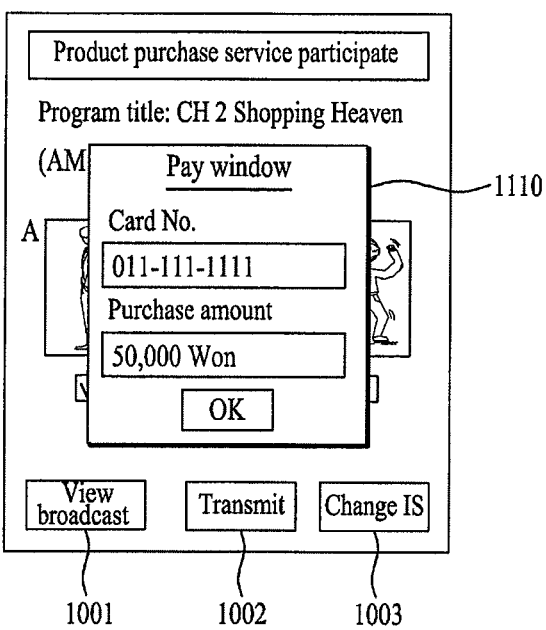

Meanwhile, if the mobile terminal 100 has a pay authority for the product purchased in FIG. 11A, the mobile terminal 100 displays a pay information input window 1110 for the product purchased via the product purchase service, as shown in FIG. 11B, receives pay information from the user, and then transmits the input pay information to the IPTV terminal 510 or the IPTV related server 520.

Further, if the IPTV terminal 510 has a pay authority for the product purchased in FIG. 11A, the mobile terminal 100 transmits the information on the product purchased via the product purchase service to the IPTV terminal 510 or the IPTV related server 520 and then enables the IPTV terminal 510 to purchase the product by transmitting a pay request signal for the purchased product to the IPTV terminal 510.

Figure 12A:
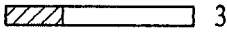
FIGS. 12A and 12B are diagrams of screen configurations for outputting participation information and an execution result of a quiz service when an interactive service provided via an IPTV terminal is the quiz service according to an embodiment of the present invention.

Referring to FIG. 12A, when an interactive service is a quiz service, the mobile terminal 100 displays such participation information as broadcast content information linked with a quiz service (broadcast channel information_CH2, broadcast program information_nationwide quiz show), time information for participating in a quiz service (AM 09:00~AM 10:00), and quiz service content information. Therefore, the user can input response information on the quiz service within a time for participating in the quiz service.

If the user selects the send/transmit region or button 1002 in FIG. 12A, the mobile terminal 100 transmits response information on the quiz service input in FIG. 12A to the IPTV terminal 510 or the IPTV related server 520 via the wireless communication unit 110.

Referring again to FIG. 6, the mobile terminal 100 can also variously set an execution timing point of the outputting step S620. For instance, when the mobile terminal 100 receives participation information for participating in the interactive service, when an output command for the participation information is input, and when a previously designated output timing point is reached, the mobile terminal 100 can output the participation information under the control of the controller 180.

In the following description, screen configurations for setting a timing point of outputting participation information for participating in an interactive service provided via the IPTV terminal 510 will be explained in more detail with reference to FIGS. 13A to 13D. For clarity and convenience of the following description, assume that an interactive service is limited to a voting service.

Referring to FIG. 13A, if the mobile terminal 100 receives participation information from the IPTV terminal 510, the mobile terminal 100 can display a window 1310 for enabling a user to select whether to output the received participation information on a screen as shown in FIG. 13A (a). If the user selects a 'now' region or button 1301 in FIG. 13A(a), the mobile terminal 100 displays participation information for participating in a voting service on the screen (see FIG. 10A, for example).

On the contrary, if the user selects a 'later' region or button 1302 in FIG. 13A(a), the mobile terminal 100 displays a list 1320 including selectable output timing points as shown in FIG. 13A(b). Further, the mobile terminal 100 displays an output timing point direct input window and is then able to directly receive an input of an output timing point from a user. For instance, if the user selects '30 minutes before end' as an output timing point from the list shown in FIG. 13A(b), the mobile terminal 100 outputs participation information 30 minutes before a voting service end timing point.

Figure 13B:
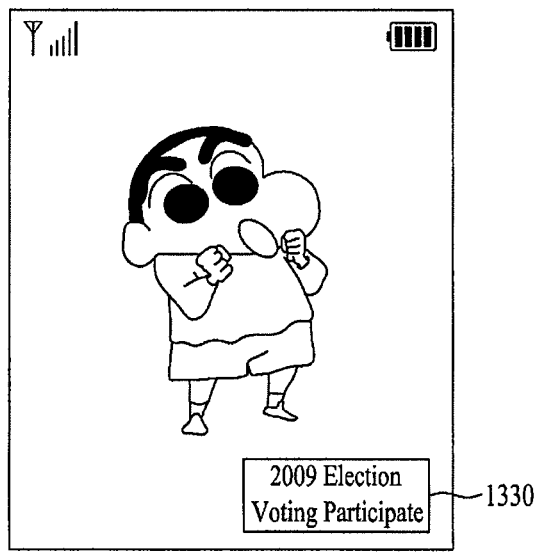

Referring to FIG. 13B, when receiving participation information from the IPTV terminal 510, the mobile terminal 100 can display an identifier 1330 on a screen (e.g., an icon), which indicates that the participation information has been received. If the user selects the identifier 1330 in FIG. 13B, the mobile terminal 100 displays a window allowing the user to select an output timing point as shown in FIG. 13A or can directly display participation information as shown in FIG. 10A.

Figure 13C:
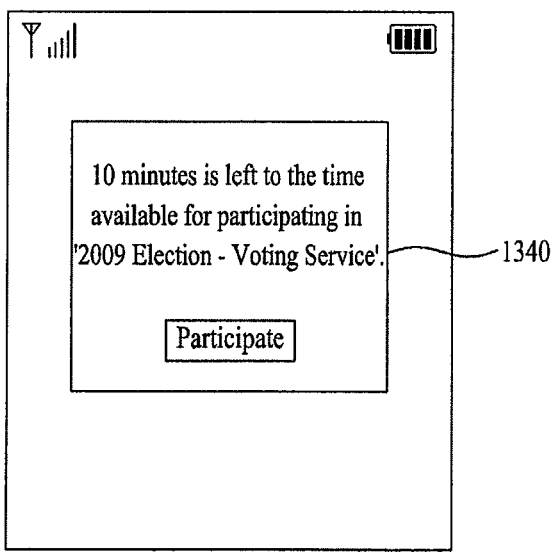

Referring to FIG. 13C, if a participation information output timing point is not designated by a user or a participation information output timing point set by a user is within a predetermined time from a voting service end timing point or after a voting service end timing point, the mobile terminal 100 informs the user of a remaining time available for participating in a voting service to enable the user to immediately participate in the voting service. In this instance, the predetermined time is a time impending to an end timing point of the voting service and can be a minimum time needed for a user to check participation information and then input response information.

Figure 13D:
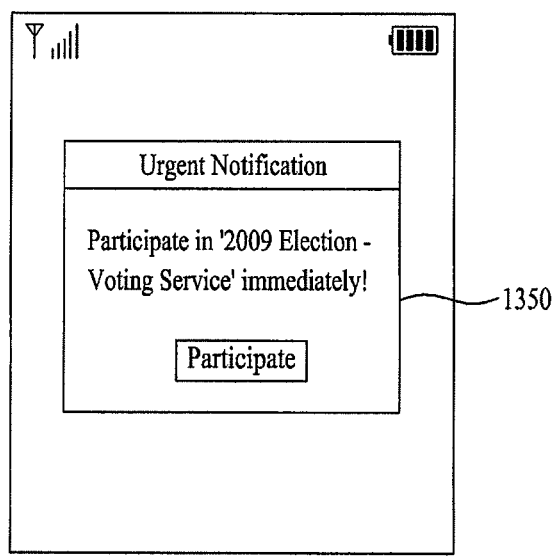

If the user selects the participation region FIG. 13C, the mobile terminal 100 displays participation information of a voting service as shown in FIG. 10A, for example. Referring to FIG. 13D, if urgent service notification information is included in the participation information for participating in a voting service, the mobile terminal 100 can lead a user to quickly participate in the voting service by informing the user that the voting service is an urgent service. Also, if participation information is received, the mobile terminal 100 can directly output the received participation information irrespective of whether a user inputs an output timing point setting operation or a participation information output command.

Moreover, the output timing point of the participation information can be set using a menu item corresponding to the participation information output timing point setting via a menu search, irrespective of a presence or non-presence of a reception of the participation information. Referring again to FIG. 6, the mobile terminal 100 can variously set an execution timing point of the transmitting step S640. For instance, under the control of the controller 180, the mobile terminal 100 can transmit the response information when the response information is completely input, when the mobile terminal 100 determines that the short-range wireless communication with the IPTV terminal 510 is possible, and when the previously designated transmission timing point is reached.

Figure 14B:
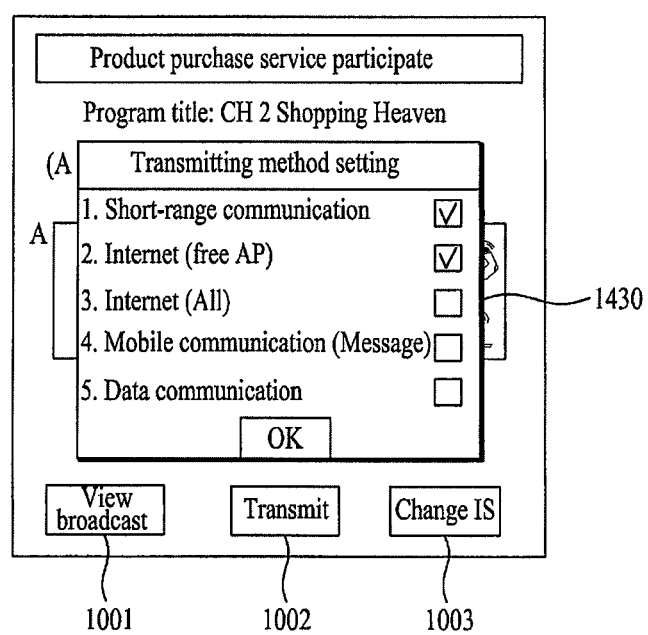

In addition, screen configurations for setting a transmission time and a transmitting method of the response information of the interactive service provided via the IPTV terminal 510 will now be explained in more detail with reference to FIGS. 14A and 14B. Referring to FIG. 14A, if the user inputs response information on an interactive service, the mobile terminal 100 displays a window 1410 for enabling the user to select a transmission timing point of the input response information on a screen (see in particular FIG. 14A(a)).

If the user selects a 'now' region or button 1401, the mobile terminal 100 can immediately transmit the response information on the interactive service. On the contrary, if the user selects a 'later' region or button 1402, the mobile terminal 100 can display a list 1420 including selectable transmission timing points as shown in FIG. 14A(b). In addition, the mobile terminal 100 can also display a transmission timing point direct input window and then enables the user to directly input the transmission timing point.

For instance, if '10 minutes before an end' is selected as a transmission timing point from the list shown in FIG. 14A(b), the mobile terminal 100 transmits the response information 10 minutes before the interactive service end timing point. Referring to FIG. 14B, the mobile terminal 100 displays a transmitting method list of response information on an interactive service. Therefore, the user can select a response information transmitting method from the list shown in FIG. 14B.

For instance, when a short-range wireless communication and an Internet (free AP) are selected from the list shown in FIG. 14B, the mobile terminal 100 transmits the response information if the mobile terminal 100 is located within a distance available for a short-range wireless communication with the IPTV terminal 510 or an Internet free access point exists around the mobile terminal 100.

Meanwhile, if a response information transmission timing point is not designated by the user or a response information transmission timing point set by the user is within a predetermined time from a voting service end timing point or after the voting service end timing point, the mobile terminal 100 informs the user of a remaining time available for participating in a voting service to enable the response information to be quickly transmitted.

If the response information is input, the mobile terminal 100 can immediately transmit the input response information even if a transmission timing point setting operation or a response information transmitting command is input by the user. Also, if an end timing point of the voting service is impending or the voting service is an emergency service, the mobile terminal 100 can immediately transmit the input response information even if a response information transmitting command is input by the user.

In addition, the user can set the transmission timing point of the response information using a menu item corresponding to a response information transmission timing point setting via a menu search, irrespective of a presence or non-presence of a reception of the participation information.

Referring again to FIG. 6, the mobile terminal 100 in step S650 receives an execution result of the interactive service according to the response information transmitted in the transmitting step S640 from the IPTV terminal 510 or the IPTV related server 520, via the wireless communication unit 110. Subsequently, in step S660, the mobile terminal outputs the execution result received in the receiving step S650 via the output unit 150.

In the following description, screen configurations for outputting the execution result of the interactive service will be explained in more detail with reference to FIGS. 10B, 11C, 11D and 12B. Referring to FIG. 10B, when the response information on the voting service input by the user in FIG. 10A is transmitted, the mobile terminal 100 receives and outputs the voting service execution result. For instance, the information according to the execution result can include voting serviced linked broadcast content information (broadcast channel_CH 1, broadcast program_2009 election) and voting result information (a polling score per candidate, etc.).

Figure 11C:

Referring to FIG. 11C, when the response information on the product purchase service input by the user in FIG. 11A is transmitted, the mobile terminal 100 receives and outputs a product purchase service execution result. For instance, the information according to the execution result can include product purchase service linked broadcast content information (broadcast channel_CH 2, broadcast program_shopping heaven) and notification information indicating that a product purchase is completed. Also, if a payment for a product purchased is settled by the mobile terminal 100, the execution result can include payment settlement information (e.g., a receipt, etc.).

Figure 11D:
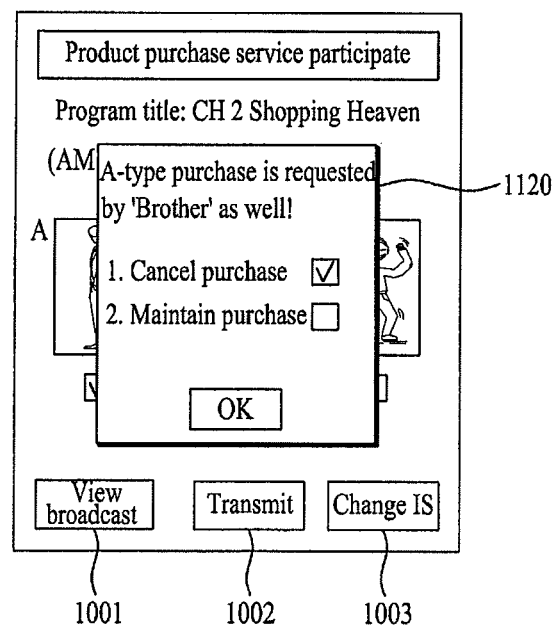

Further, as shown in FIG. 11D, if a different one of terminals previously registered to participate in an interactive service provided via the IPTV terminal 510 makes a purchase request for the product that is also purchased-requested by the mobile terminal 100, the mobile terminal 100 receives notification information indicating that the different terminal made a purchase request for the same product as the product purchase service execution result and then displays a window 1120 allowing the user to select 'maintain purchase' or 'cancel purchase' for the purchase-requested product.

Figure 12B:
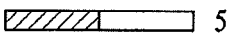

Referring to FIG. 12B, when the response information on the quiz service input by the user in FIG. 12A is transmitted, the mobile terminal 100 receives and outputs a quiz service execution result. For instance, the information according to the execution result can include a quiz service linked broadcast content information (broadcast channel_CH 2, broadcast program_nationwide quiz show) and a quiz response result information (e.g., a selection rate per candidate).

Further, the mobile terminal 100 according to embodiments of the present invention can perform various supplementary services using participation information for participating in an interactive service provided via the IPTV terminal 510, which will now be explained in more detail with reference to FIGS. 15A to 15D.

Figure 15A:
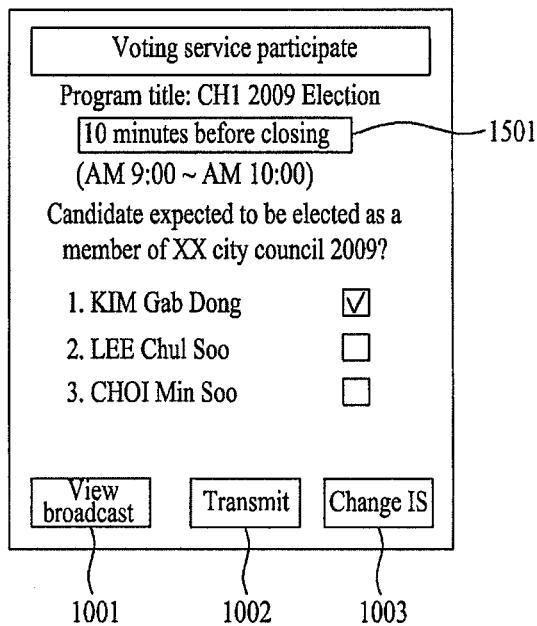
FIGS. 15A to 15D are diagrams of screen configurations for executing a supplementary service using participation information of an interactive service provided via an IPTV terminal according to an embodiment of the present invention.

Referring to FIG. 15A, when displaying participation information, the mobile terminal 100 can display a remaining time 1501 available for participating in an interactive service, the region or button ('view broadcast') 1001 for receiving a command for viewing a broadcast content linked with an interactive service, the region or button ('transmit') 1002 for receiving a command for transmitting response information, and the region or button ('change IS') 1003 for receiving a command for changing an interactive service.

If the user selects the 'view broadcast' region or button 1001 in FIG. 15A, the mobile terminal 100 transmits a request signal for a broadcast content (hereinafter named a linked broadcast content) linked with an interactive service corresponding to the participation information, which is being output in FIG. 15A, to the IPTV terminal 510 or the IPTV related server 520 via the wireless communication unit 110 under the control of the controller 180. The terminal 100 then receives a broadcast signal corresponding to the linked broadcast content from the IPTV terminal 510 or the IPTV related server 520.

Figure 15B:
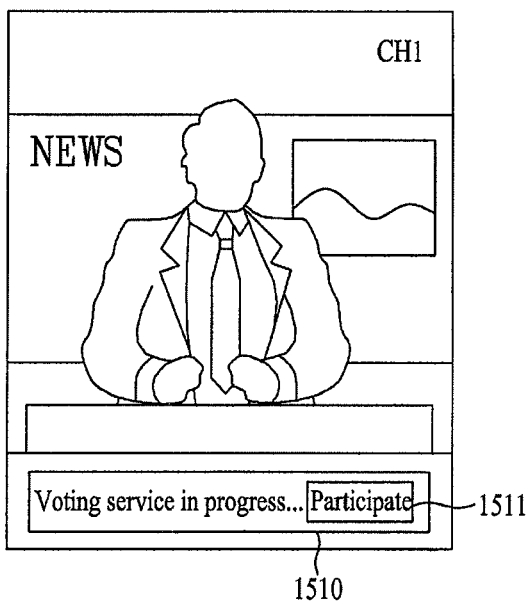

Subsequently, referring to FIG. 15B, the mobile terminal 100 outputs the broadcast signal corresponding to the linked broadcast content. Further, as shown in FIG. 15B, while displaying a broadcast output image, the mobile terminal 100 displays a region 1511 for receiving a selection of a presence or non-presence of participation from the user in the course of indicating that an interactive service is in progress on a prescribed area of the screen.

Figure 15C:
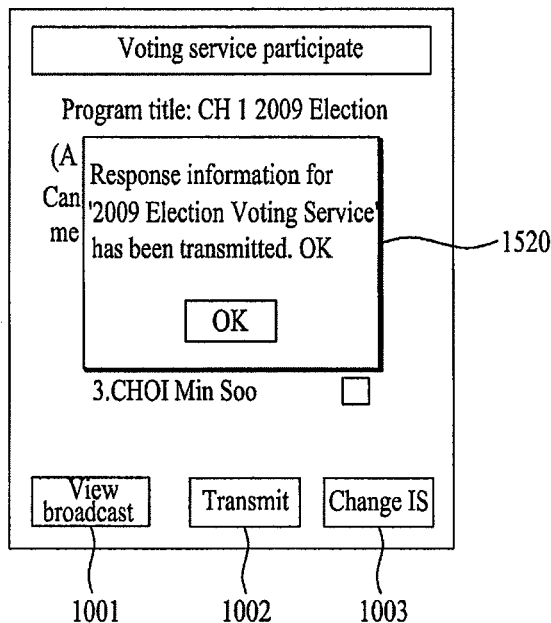

Referring to FIG. 15C, if the user selects the 'transmit' region or button 1002 in FIG. 15A, the mobile terminal 100 transmits the response information input by the user and outputs a transmission completion indicating message indicating the transmission completion of the response information, under the control of the controller 180.

Figure 15D:
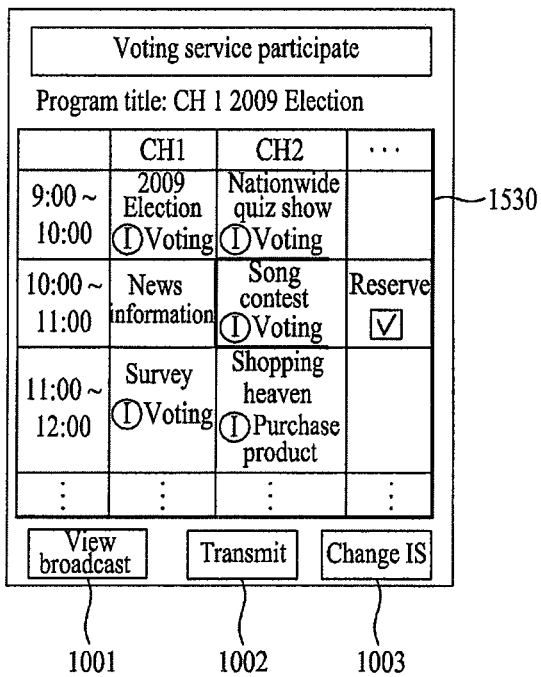

Referring to FIG. 15D, if the user selects the 'change IS' region or button 1003 in FIG. 15A, the mobile terminal 100 displays a window 1530 for receiving a selection for a specific interactive service under the control of the controller 180. For instance, the displayed window 1530 can include a broadcast organization table having an interactive service linked broadcast content represented distinguishably thereon or a list of interactive services currently available for participation.

If the user selects a specific interactive service in FIG. 15D, the mobile terminal 100 transmits a signal for requesting a change into the selected specific interactive service to the IPTV terminal 510 or the IPTV related server 520 and then receives participation information for participating in the specific interactive service from the IPTV terminal 510. Further, the former description is applicable to details of the output of the participation information for participating in the specific interactive service and the corresponding response information.

In addition, the mobile terminal 100 according to embodiments of the present invention can control operations of the IPTV terminal 510 if a viewing reservation is set at the IPTV terminal 510. For instance, when the mobile terminal 100 is not located within a predetermined distance from the IPTV terminal 510, the above operation control is applicable to the user being unable to view a broadcast using the IPTV terminal 510. This feature will now be explained in more detail with reference to FIGS. 16A and 16B.

Figure 16A:
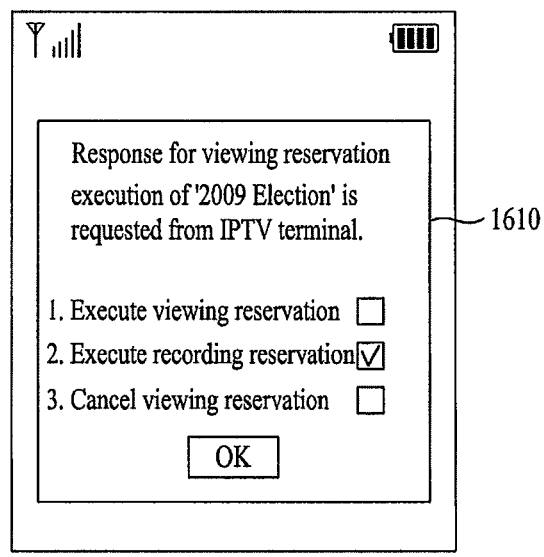
FIGS. 16A and 16B are diagrams of screen configurations for controlling an operation of an IP terminal using a mobile terminal if a viewing reservation is set in an IPTV terminal according to an embodiment of the present invention.

First, if a viewing reservation is set at the IPTV terminal 510 for a specific broadcast content or a specific time, the mobile terminal 100 receives a request for a response to an execution of the set viewing reservation from the IPTV terminal 510. Referring to FIG. 16A, if the response to the execution of the set viewing reservation is requested, the mobile terminal 100 displays a window 1610 including a response list having selectable responses. For instance, the response list can include 'execute viewing reservation', 'execute recording reservation', 'cancel viewing reservation' and the like.

Figure 16B:
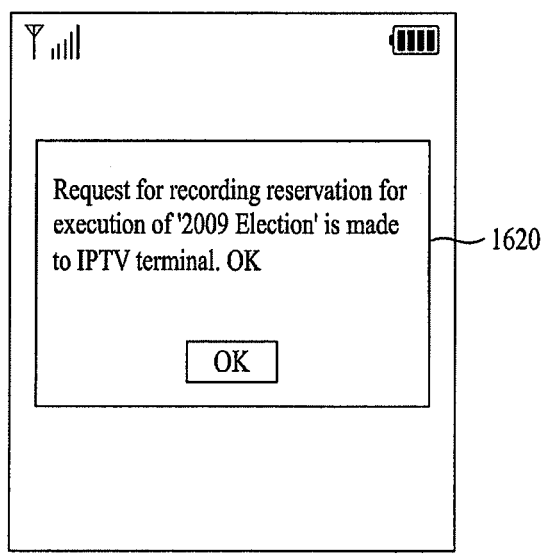

If the user selects 'execute recording reservation' in FIG. 16A, the mobile terminal 100 transmits a signal (hereinafter named a recording reservation request signal) for requesting a recording reservation for the specific broadcast content or the specific time, for which the viewing reservation was set, to the IPTV terminal 510. The mobile terminal 100 then displays a transmission result of the recording reservation request signal as shown in FIG. 16B. Therefore, the IPTV terminal 510 receives the recoding reservation request signal from the mobile terminal 100 and executes the recording reservation for the specific broadcast content or the specific time, for which the viewing reservation was set.

Accordingly, embodiments of the present invention provides several advantages. First, the user of the mobile terminal can participate in an interactive service, which is an execution target in an IPTV terminal. Secondly, the mobile terminal can participate in an interactive service in a manner of receiving interactive service participation information from an IPTV terminal and then transmitting response information in response to the received information only, the transceived size can become smaller than when an interactive service is directly performed using the IPTV terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
    a wireless communication unit configured to wirelessly communicate with an Internet Protocol Television (IPTV) terminal and to receive participation information for participating in an interactive service from the IPTV terminal;
    an output unit configured to output the received participation information for the interactive service;
    a user input unit configured to receive an input of response information corresponding to the output participation information for the interactive service; and
    a control unit configured to control the wireless communication unit to transmit the input response information to the IPTV terminal or to a related IPTV server performing the interactive service with the IPTV terminal, and to receive information corresponding to the interactive service, wherein the input unit is further configured to receive a designated signal indicating a specific place or location of the mobile terminal where the user wants to participate in the interactive service, wherein the controller is further configured to control the wireless communication unit to transmit a notification signal to the IPTV terminal for receiving the participation information in response to the notification signal, when the mobile terminal is located at the specific place or location, and wherein the control unit is further configured to control the wireless communication unit to receive the participation information, when the mobile terminal is within a predetermined distance from the IPTV terminal.

2. The mobile terminal of claim 1, wherein the interactive service is performed on the IPTV server and the information corresponding to the interactive service is received by the IPTV terminal via an Internet communication connection between the IPTV related server and the IPTV terminal.

3. The mobile terminal of claim 2, wherein the IPTV terminal transmits the information corresponding to the interactive service to the mobile terminal via a short range wireless communication method different than the Internet communication connection between the IPTV related server and the IPTV terminal, and wherein the control unit is further configured to control the wireless communication unit to receive the information corresponding to the interactive service from the IPTV terminal and to control the output unit to output the received information corresponding to the interactive service.

4. The mobile terminal of claim 3, wherein the predetermined distance is an available distance for the short-range wireless communication with the IPTV terminal.

5. The mobile terminal of claim 1, wherein the received participation information for the interactive service output on the output unit includes at least one of a) a selectable option indicating a user of the mobile does want to participate in the interactive service, b) detailed information about the interactive service and c) a broadcast organization information including a plurality of broadcast programs and iconic information indicating whether a corresponding broadcast program includes the interactive service.

6. The mobile terminal of claim 1, wherein the control unit is further configured to control the output unit to output options for allowing a user of the mobile terminal to instruct when the output unit is to output the information corresponding to the interactive service.

7. The mobile terminal of claim 1, wherein the controller is further configured to control the output unit to output the received participation information after a lapse of a predetermined time.

8. A method of controlling a mobile terminal, the method comprising:

wirelessly communicating, via a wireless communication unit, with an Internet Protocol Television (IPTV) terminal and receiving participation information for participating in an interactive service from the IPTV terminal;

outputting, via an output unit, the received participation information for the interactive service;

receiving, via a user input unit, an input of response information corresponding to the output participation information for the interactive service;

transmitting, via a control unit controlling the wireless communication unit, the input response information to the IPTV terminal or to a related IPTV server performing the interactive service with the IPTV terminal;

receiving, via the wireless communication unit, information corresponding to the interactive service;

receiving, via the input unit, a designated signal indicating a specific place or location of the mobile terminal where the user wants to participate in the interactive service; and transmitting, via the wireless communication unit, a notification signal to the IPTV terminal for receiving the participation information in response to the notification signal, when the mobile terminal is located at the specific place or location, wherein the wireless communication unit further receives the participation information, when the mobile terminal is within a predetermined distance from the IPTV terminal.

9. The method of claim 8, wherein the interactive service is performed on the IPTV server and the information corresponding to the interactive service is received by the IPTV terminal via an Internet communication connection between the IPTV related server and the IPTV terminal.

10. The method of claim 9, wherein the IPTV terminal transmits the information corresponding to the interactive service to the mobile terminal via a short range wireless communication method different than the Internet communication connection between the IPTV related server and the IPTV terminal, and wherein the method further comprises receiving, via the wireless communication unit, the information corresponding to the interactive service from the IPTV terminal and outputting, via the output unit, the received information corresponding to the interactive service.

11. The method of claim 10, wherein the predetermined distance is an available distance for the short-range wireless communication with the IPTV terminal.

12. The method of claim 8, wherein the output participation information for the interactive service includes at least one of a) a selectable option indicating a user of the mobile does want to participate in the interactive service, b) detailed information about the interactive service and c) a broadcast organization information including a plurality of broadcast programs and iconic information indicating whether a corresponding broadcast program includes the interactive service.

13. The method of claim 8, further comprising:

outputting, via the output unit, options for allowing a user of the mobile terminal to instruct when the output unit is to output the information corresponding to the interactive service.

14. A mobile terminal, comprising:

a wireless communication unit configured to wirelessly communicate with an Internet Protocol Television (IPTV) terminal and to receive participation information for participating in an interactive service from the IPTV terminal;

an output unit configured to output the received participation information for the interactive service;

a user input unit configured to receive an input of response information corresponding to the output participation information for the interactive service; and a control unit configured to control the wireless communication unit to transmit the input response information to the IPTV terminal or to a related IPTV server performing the interactive service with the IPTV terminal, and to receive information corresponding to the interactive service, wherein the control unit is further configured to control the wireless communication unit to receive the participation information, when the mobile terminal is within a predetermined distance from the IPTV terminal,
wherein the controller is further configured to control the output unit to output the received participation information after a lapse of a predetermined time, and
wherein if a current time is close to an end time of the interactive service, the controller is further configured to control the output unit to output the received participation information regardless of the lapse of the predetermined time.

* * * * *